(12) United States Patent
Yamaoka

(10) Patent No.: US 7,869,328 B2
(45) Date of Patent: Jan. 11, 2011

(54) OPTICAL DISK AND OPTICAL DISK REPRODUCING DEVICE

(75) Inventor: Masaru Yamaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 12/052,854

(22) Filed: Mar. 21, 2008

(65) Prior Publication Data

US 2008/0232220 A1 Sep. 25, 2008

(30) Foreign Application Priority Data

Mar. 22, 2007 (JP) .............................. 2007-074178
Mar. 11, 2008 (JP) .............................. 2008-060949

(51) Int. Cl.
*G11B 7/00* (2006.01)
(52) U.S. Cl. .................. 369/94; 369/53.21; 369/53.34; 369/59.23; 369/59.25; 369/275.2; 369/275.4; 369/275.5
(58) Field of Classification Search ............. 369/53.21, 369/53.34, 59.25, 59.23, 275.2, 275.4, 275.5, 369/94
See application file for complete search history.

(56) References Cited

U.S. PATENT DOCUMENTS

| | | | | |
|---|---|---|---|---|
| 5,809,007 A | * | 9/1998 | Takemura et al. ........ | 369/275.3 |
| 6,052,465 A | * | 4/2000 | Gotoh et al. ............. | 369/53.21 |
| 6,852,383 B2 | * | 2/2005 | Sako et al. .................. | 428/64.1 |
| 7,092,333 B2 | * | 8/2006 | Morioka et al. .......... | 369/53.12 |
| 7,596,069 B2 | * | 9/2009 | Steenbergen et al. ..... | 369/59.23 |
| 2002/0120861 A1 | | 8/2002 | Kagiwada et al. | |
| 2007/0263525 A1 | * | 11/2007 | Ohkubo .................... | 369/275.2 |

FOREIGN PATENT DOCUMENTS

JP        2002-324200        11/2002

* cited by examiner

*Primary Examiner*—Wayne R Young
*Assistant Examiner*—Linh T Nguyen
(74) *Attorney, Agent, or Firm*—Wenderoth, Lind & Ponack, L.L.P.

(57) ABSTRACT

To provide an optical disk and an optical disk reproducing device capable of preventing sub information from being illegally copied and altered. An optical disk includes an optical disk substrate preliminarily provided with concave/convex recording marks in order to record the main information; and a reflection film which covers the optical disk substrate and of which the reflection coefficient is changed by irradiating laser light at or above a certain intensity. The reflection film is preliminarily provided with additional marks for recording the sub information by changing the reflection coefficient of the reflection film on a region where the concave/convex recording marks are formed and the sub information is recorded for every predetermined recording unit for recording the main information. The laser light at or above the certain intensity is irradiated onto the region where the sub information is recorded to reproduce the main information and delete the sub information.

19 Claims, 13 Drawing Sheets

FIG.3
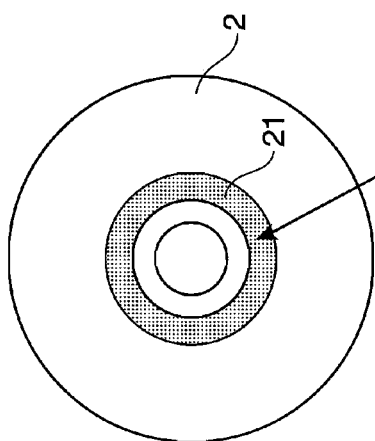
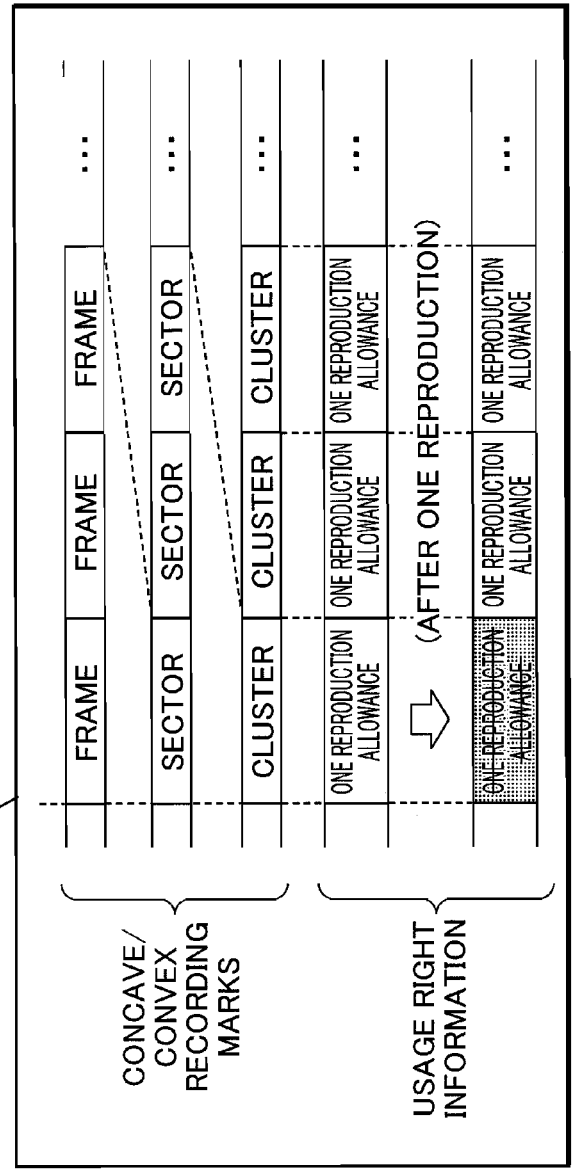

FIG.5
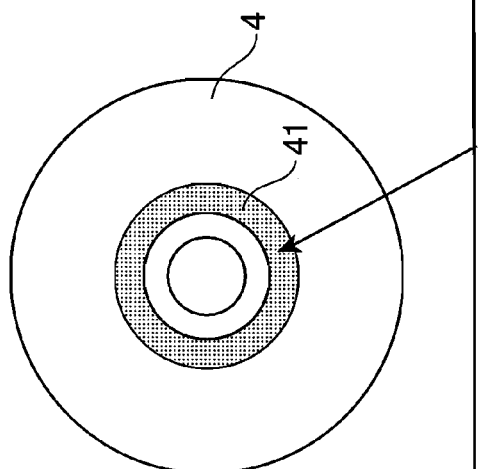
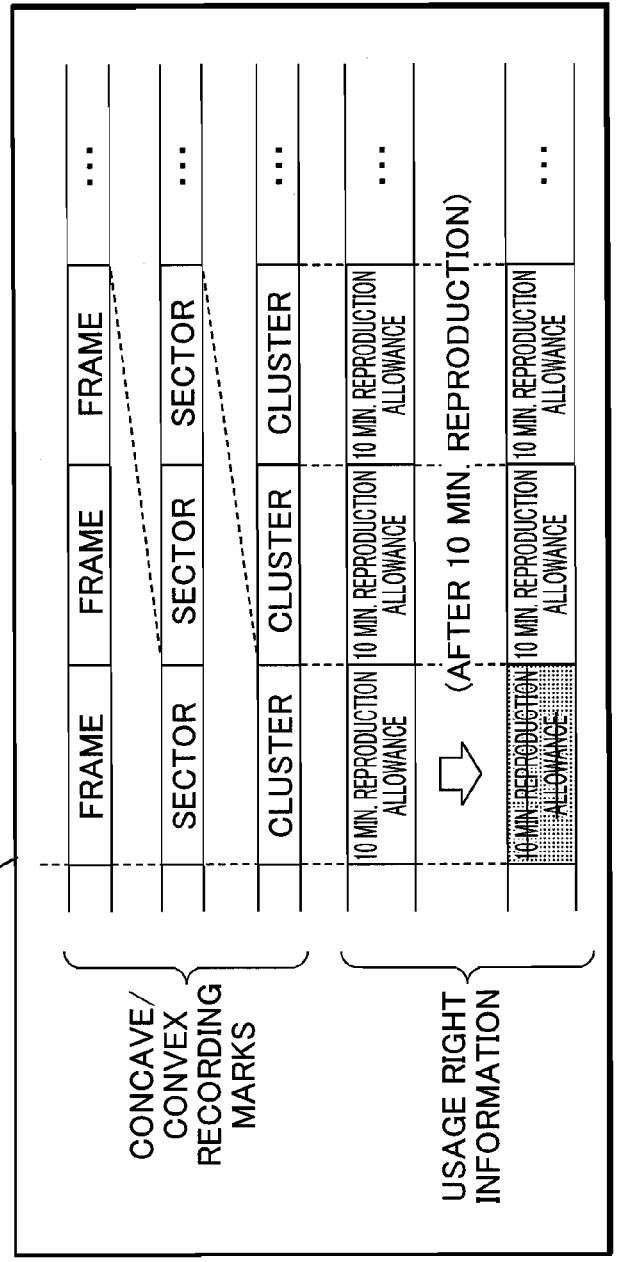

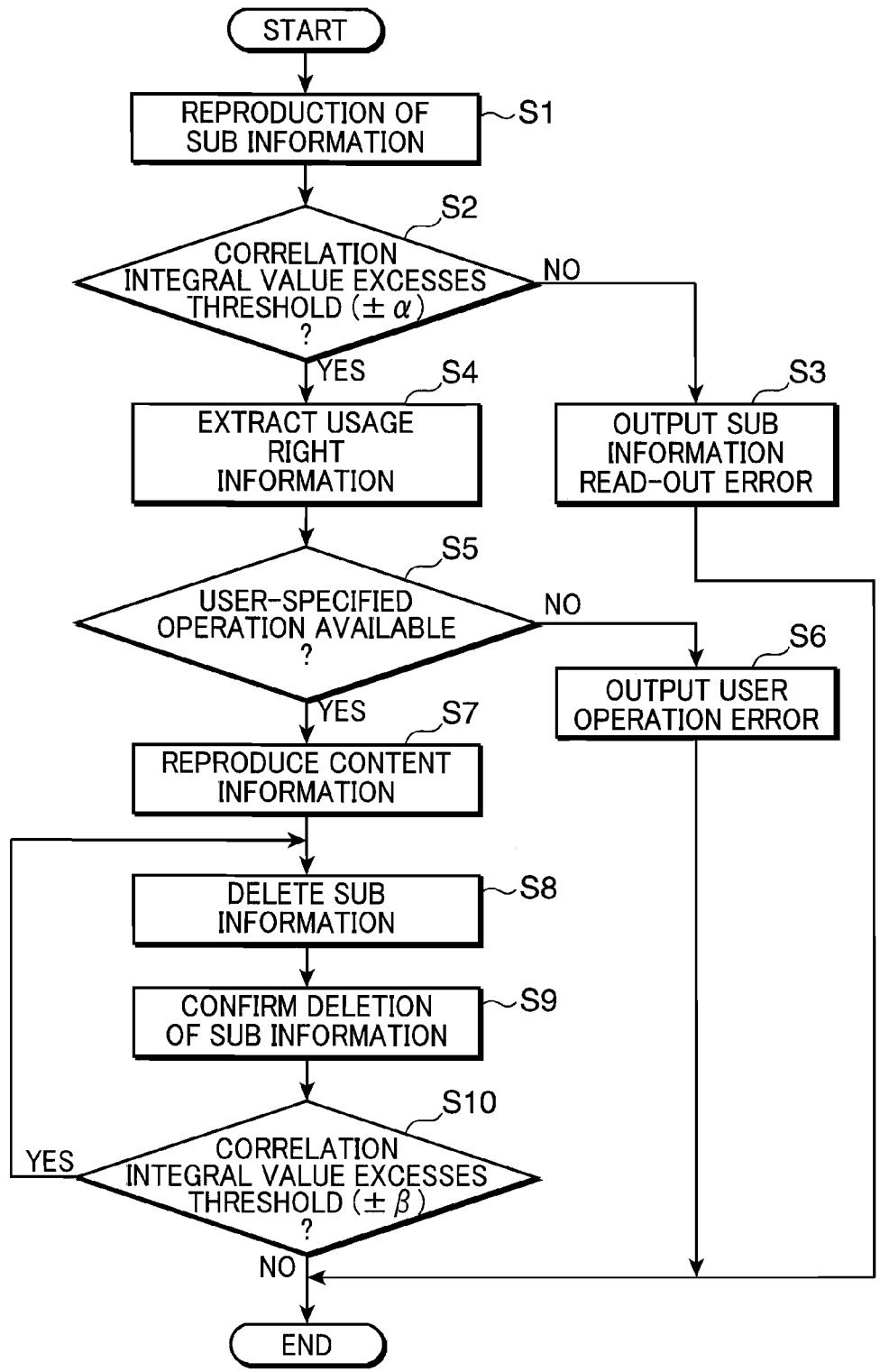

OPTICAL DISK AND OPTICAL DISK REPRODUCING DEVICE

BACKGROUND OF THE INVENTION

1. Field of the Invention

The present invention relates to an optical disk in which main formation is recorded by concave/convex recording marks as well as sub information is recorded by changing the reflection coefficient of a reflection film provided on a region where the concave/convex recording marks are formed, and an optical disk reproducing device for reproducing the optical disk.

2. Description of the Background Art

Recently, optical disks have been widely used as a content distribution medium for movies, music, games, and the like. Also, because of the recent dissemination of high-speed networks, distribution of content information via a network has become active.

In obtaining the content information via the network, a usage fee of the content information will be billed. A safe billing is done currently by utilizing a credit card or card type electronic money. Therefore, users who do not have credit cards or electronic money are not able to use such a system.

In view of the above, such inventions are disclosed that users who do not have credit cards can use an electronic payment via a network (for example, see Japanese Unexamined Patent Publication No. 2002-324200).

According to the above described technique, a user initially purchases an optical disk or a prepaid card assigned with a specific media identification number (SC-ID). Then, a client terminal device reads out the media identification number and identification information (MC-ID) specified for every memory card. A client ID specified for every client device is sent to a server together with the media identification number. The server stores a prepaid money amount corresponding to the SC-ID in association with the MC-ID and the client ID. The server, subsequently, specifies the user to be served based on the MC-ID and the client ID upon providing a service, and takes a billing procedure to a prepaid money amount of the user for a money amount consistent with the service to be provided, thereby providing the service. Therefore, a service requiring billing can be provided to a user without a credit card.

However, the above described conventional technique necessitates a network connection with a server in order to perform the billing procedure. As such, the above-described conventional technique cannot be used in such a situation that a server cannot be connected to a network. For example, in the case where every view of the content information having been stored in a memory card is required to be billed, if the client terminal device cannot be connected to the network, the user cannot use the content information.

Also, the above-described conventional technique requires an optical disk or a prepaid card storing money amount information in addition to a memory card.

Further, in the case where the money amount information is recorded in the optical disk by a normal recording method, there is a problem of illegal copying of the money amount information.

Still further, since the money amount information is registered at the server side upon using it, past-used optical disk or prepaid card information should be managed semipermanently. Without such management of information, the spent optical disk or prepaid card may be used illegally.

SUMMARY OF THE INVENTION

The present invention is made to solve the above described problems. It is, therefore, an object of the present invention to provide an optical disk capable of preventing sub information from being illegally copied or altered and an optical disk reproducing device therefore.

An aspect of an optical disk of the present invention includes a substrate on which concave/convex recording marks are preliminarily formed in order to record main information; and a reflection film which covers the substrate and of which the reflection coefficient changes by irradiating laser light at or above a certain intensity; in which the reflection film is preliminarily provided with additional marks for recording sub information by changing the reflection coefficient of the reflection film on a region where the concave/convex recording marks are formed; the sub information is recorded for every predetermined recording unit recording the main information; and the main formation is reproduced as well as the sub information is deleted by irradiating the laser light at or above the certain intensity onto a region where the sub information is recorded.

Another aspect of the optical disk reproducing device of the present invention includes a laser light irradiation unit for irradiating laser light to an optical disk on which concave/convex recording marks are formed in order to record main information and additional marks are also formed by changing the reflection coefficient of a reflection film on a region where the concave/convex recording marks are formed in order to record sub information; a reproduction signal generation unit for generating reproduction signal based on reflecting light from the optical disk; a clock signal extraction unit for extracting clock signal synchronizing with the reproduction signal generated by the reproduction signal generation unit; a main information reproducing unit for reproducing the main information from signal band components corresponding to the concave/convex recording marks of the reproduction signal generated by the reproduction signal generation unit synchronizing with the clock signal extracted by the clock signal extraction unit; a filter unit for extracting signal band components corresponding to the additional marks from the reproduction signal generated by the reproduction signal generation unit; a sub information detection unit for detecting sub information from the signal band components extracted by the filter unit synchronizing with the clock signal extracted by the clock signal extraction unit; a usage right information generation unit for generating usage right information as to a right to use content information from the sub information detected by the sub information detection unit; a user operation reception unit for receiving an operation of a user to the content information; a user operation determination unit for determining whether or not the operation received by the user operation reception unit is available based on the usage right information generated by the usage right information generation unit; and a sub information deletion unit for reproducing the main information as well as deleting the sub information by irradiating laser light at or above a predetermined intensity onto the optical disk if the user operation determination unit determines that the operation is available.

BRIEF DESCRIPTION OF THE DRAWINGS

FIG. 3 is a schematic diagram illustrating the optical disk recording reproducible number limit information as usage right information.

FIG. 5 is a schematic diagram illustrating the optical disk recording reproducible time information as the usage right information.

FIG. 13 is a flow chart illustrating a flow of a process for reproducing the sub information, deleting the sub information, and confirming the deletion of the sub information.

DETAILED DESCRIPTION OF THE PREFERRED EMBODIMENTS OF THE INVENTION

Embodiments of the present invention will now be described with reference to the accompanying drawings. The following embodiments are mere examples of the present invention, and thus do not limit a technical scope of the present invention.

(Optical Disk Configuration)

Figure 1:
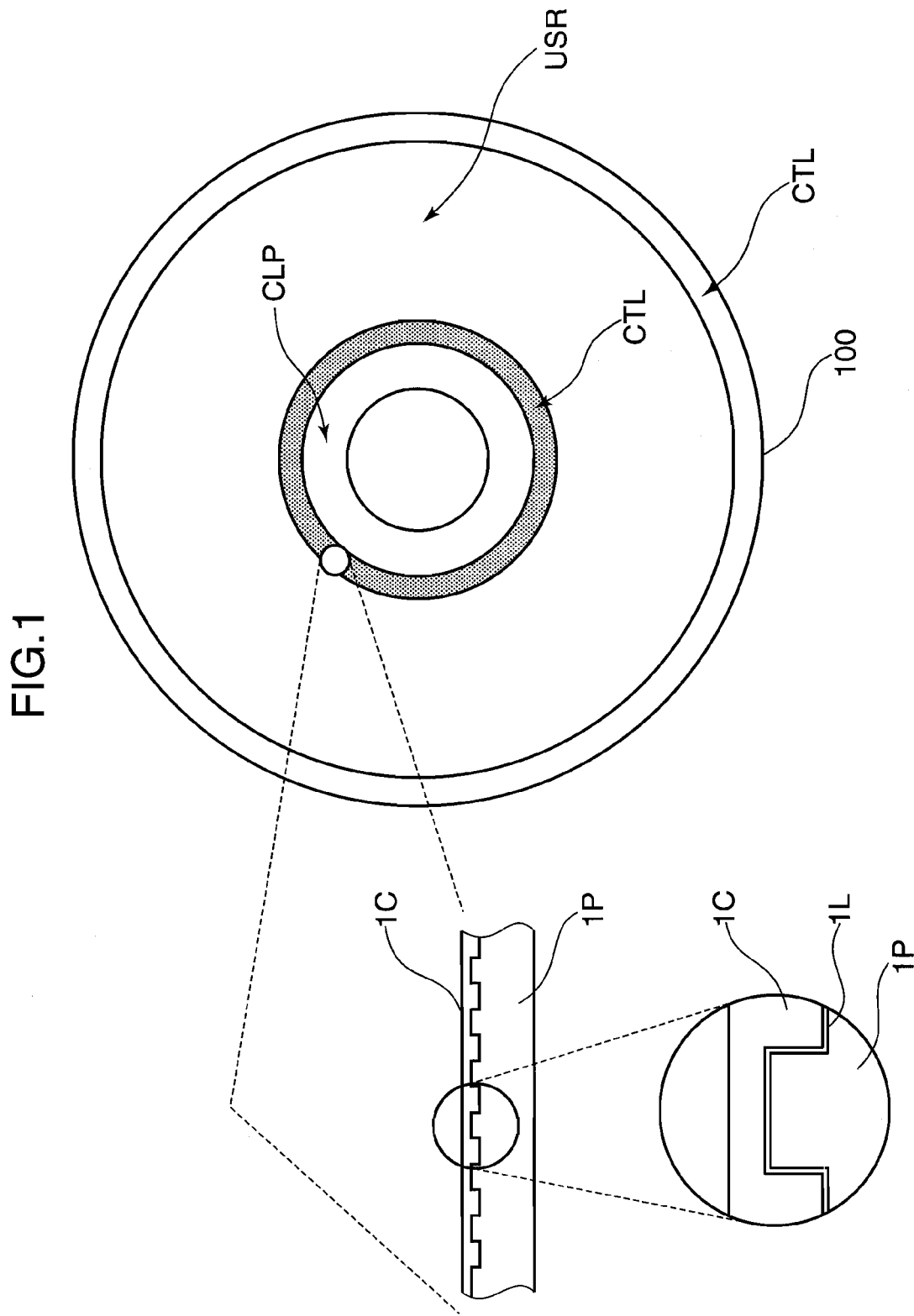
FIG. 1 is a schematic diagram illustrating a configuration of an optical disk according to an embodiment of the present invention.

FIG. 1 is a schematic diagram illustrating a configuration of an optical disk according to an embodiment of the invention. An optical disk 100 of FIG. 1 includes a clamping region CLP, an inner circumference side control region CTL, an outer circumference side control region CTL, and a user region USR.

The clamping region CLP is a runover unit for loading the optical disk 100 and thus no information is recorded thereon. The user region USR includes content information or the like by means of concave/convex recording marks.

The control region CTL is provided at an inner circumference side of the user region USR and an outer circumference side of the user region USR, and record managing information or the like of the optical disk 100 by means of concave/convex recording marks. The optical disk 100 is characterized in that the sub information is recorded such that the reflection coefficient of a reflection film 1L on a region where the concave/convex recording marks of a track identical to a track of the concave/convex recording marks of the inner circumference side control region CTL is changed partially by irradiating laser light.

The optical disk 100 is formed such that stamped concave/convex recording marks are transferred to an optical disk substrate 1P, a reflection film 1L of which the reflection coefficient is changed according to laser irradiation is vapor deposited (sputtered) onto the thus transferred concave/convex recording marks, and a surface thereof is coated with a cover layer 1C by, for example, an application of a thin film sheet or a spin coat method. After the formation of the optical disk 100, the sub information is superimposed onto every optical disk as specific information thereof by means of laser irradiation onto the concave/convex recording marks of the inner circumference side control region CTL.

The reflection film 1L of the optical disk 100 is made of a pigmented coat of an organic material which shows an irreversible change of the reflection coefficient upon being irradiated by laser light. Recording can be carried out to this reflection film 1L by changing the reflection coefficient thereof with a thermal fluctuation caused by the irradiation of the laser light at a predetermined intensity.

As described above, the optical disk 100 includes an optical disk substrate 1P on which concave/convex recording marks are preliminarily formed in order to record the main information and a reflection film 1L which covers the optical disk substrate 1P and of which the reflection coefficient changes by being irradiated with the laser light at or above a certain intensity. The reflection film 1L is preliminarily provided with additional marks for recording the sub information by changing the reflection coefficient of the reflection film 1L on a region where the concave/convex recording marks are formed. Also, the sub information is recorded for each of the predetermined recording units in which the main information is recorded and the laser light at or above a certain intensity is irradiated onto the region where the sub information is recorded, and thereby the main information is reproduced and the sub information is deleted as well.

Figure 2:
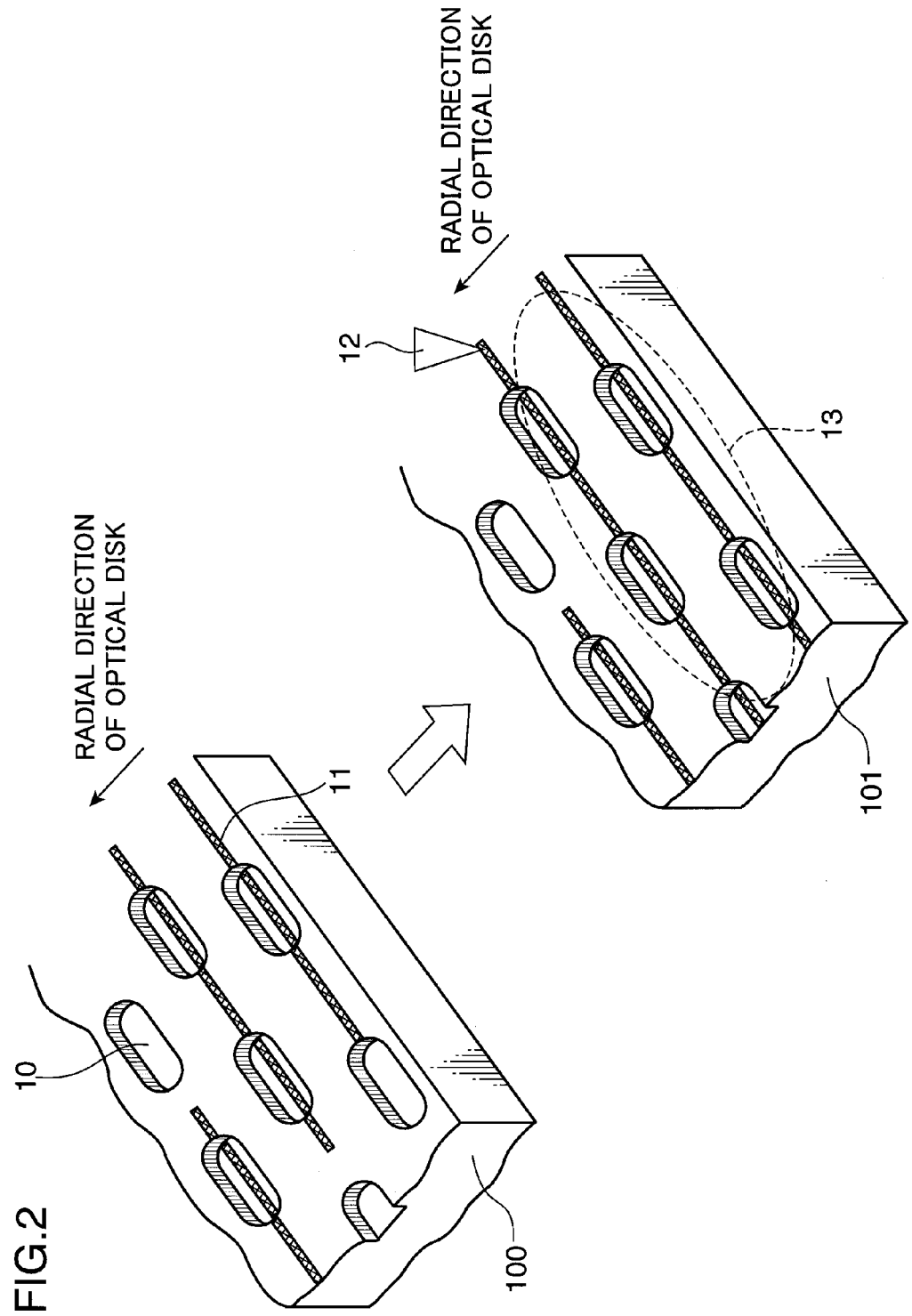
FIG. 2 is a schematic diagram illustrating a recording surface of an inner circumference side control region of the optical disk according to the present embodiment.

FIG. 2 is a schematic diagram illustrating a recording surface of the inner circumference side control region of the optical disk according to the present embodiment. The optical disk 100 according to the embodiment of the invention records content information (main information) together with usage right information (sub information) of the content information.

The optical disk 100 according to the embodiment is provided with concave/convex recording marks 10 which record the main information having been encoded and modulated. The main information includes the content information and managing information for managing the content information. When reproducing the optical disk 100, laser light having a reproducible intensity is focused and irradiated onto the recording surface of the optical disk, and the concave/convex recording marks 10 are read by means of the intensity of the reflection light to thereby reproduce the managing information and the content information.

Also, the optical disk 100, as a reflection film for coating the recording surface, is a material which can change its reflection coefficient of the light of a specific wavelength by laser irradiation. This reflection film may be a pigmented coat which is generally used in a write once media. Before shipping, laser light of a recording intensity higher than a reproduction intensity is irradiated onto the optical disk 100 which has recorded the content information and thus formed, and thereby additional marks 11 partially having a different reflection coefficient are formed to preliminarily record the sub information. The sub information includes the usage right information as to a right to allow the user to use the content information.

The usage right information of the content information includes money amount information representing a money amount available for a billing procedure when the user downloads the content information, reproducible number information representing the number of times of allowable reproduction of the content information preliminarily recorded by the concave/convex recording marks 10, reproducible time information representing an allowable time for reproducing the content information recorded by the concave/convex recording marks 10, or the like.

The above-stated usage right information is deleted when the user downloads the content information or uses the recorded content information. An optical disk 101 of FIG. 2 illustrates an example of an optical disk of which usage right information is partially deleted.

The usage right information is deleted in such a manner that laser light 12 of the recording intensity is irradiated onto a region where the additional marks are recorded by changing the reflection coefficient on the concave/convex recording marks, thereby changing the reflection coefficient of the entire region of the reflection film where the laser light 12 has been irradiated so as to delete the usage right information. In a region 13 illustrated by a broken line in FIG. 2, the additional marks are over-written by the laser light 12 to delete the usage right information.

With the use of the optical disk according to the present embodiment, if optical disks that preliminarily record the content information and the usage right information of the content information at the time of shipping are distributed and the user executes a right to the content information, optical disks which can delete the usage right information by irradiating laser light of the recording intensity can be realized. In using the optical disk, a billing procedure can be carried out with regard to a download of the content information while the optical disk reproducing device is not connected to a network without raising unit values of an optical disk and an optical disk record reproducing device. As such, safe usage control of the content information can be realized.

(Usage Number Limit)

A method of limiting the reproduction number of the content information recorded in the optical disk will now be described exemplifying another optical disk according to the embodiment of the invention.

FIG. 3 is a schematic diagram illustrating an optical disk recording the reproducible number information as the usage right information.

An optical disk 2 of FIG. 3 records in an inner circumferential side control data region 21 of the optical disk the managing information for reproducing the optical disk, and the usage right information as to the reproducible number of the content information recorded in the optical disk. The managing information is recorded by the concave/convex recording marks. The usage right information is recorded such that the laser light is irradiated onto the concave/convex recording marks to have the additional marks, in which the reflection coefficient of the reflection film is changed, record the usage right information.

The managing information recorded in the control data region 21 of the optical disk 2 by the concave/convex recording marks is recorded in a format comprising frames as a data unit sectioned by a synchronization code in order to reproduce the information, sectors as a data unit which are composed of a plurality of frames and sectioned by address information, and clusters as a data unit which are composed of a plurality of sectors and encoded into an error-correction code.

The usage right information, which is recorded by changing the reflection coefficient of the reflection film on the concave/convex recording marks in the control data region 21 of the optical disk 2, is recorded by synchronizing a data configuration of the concave/convex recording marks, namely, each of the frames, the sectors, and the clusters. According to the present embodiment, the usage right information representing only one reproduction allowance per cluster unit is recorded. Therefore, the reproducible number information includes multiple reproduction allowance information according to the number of times reproduction of the content information, namely, one cluster includes one piece of reproduction allowance information which allows one reproduction of the content information. For example, if reproduction of the content information is allowed three times, the optical disk 2 will record three pieces of reproduction allowance information as the reproducible number information.

If the user reproduces the content information once, laser light is irradiated onto a first cluster recording the usage right information to change the reflection coefficient of the reflection film in the first cluster, thereby deleting the additional marks. Accordingly, the reproduction allowance information corresponding to one reproduction of the content information is deleted.

According to the present embodiment, the usage right information includes the reproduction allowance information, for allowing the reproduction of the content information once, according to the number of times that reproduction of the content information is allowed. Then, upon every reproduction of the content information, one reproduction allowance information is deleted.

As described above, the optical disk according to the present embodiment synchronizes with the data configuration of the concave/convex recording marks to formed the additional marks by changing the reflection coefficient of the reflection film, and therefore, an additional synchronization code or the like for reproducing the additional marks is not required, such that it also can reproduce the additional marks corresponding to the data configuration of the concave/convex recording marks upon reproduction of the concave/convex recording marks.

Also, the optical disk according to the present embodiment records the reproduction allowance information for allowing one reproduction of the content information for every cluster unit of the concave/convex recording marks. Therefore, every time the user reproduces the content information, the additional marks of the first cluster containing the usage right information is deleted to thereby control the number of times of use of the content information.

In the present embodiment, since a network is not required, the user can use the optical disk anywhere without being limited to a place connectable to the network.

Also, the optical disk reproducing device normally performs a center position control in order for a stable read of the reproduction signal of the concave/convex recording marks. In the additional marks of the optical disk, the presence or the absence of the change of the reflection coefficient is used for restoring the usage right information, such that it is preferable for a recording zone of the additional marks to be recorded in a zone prior to the following zone where the center position control of the reproduction signal of the optical disk reproducing device is performed.

The present embodiment has such a configuration that, but not limited to, the reproduction allowance information representing one reproduction allowance is recorded in each cluster of the concave/convex recording marks as the additional marks. The reproduction allowance information may be recorded by the frame unit or the sector unit, which also can produce the same effect as the above configuration. The reproduction allowance information may be recorded over a plurality of continuous clusters. Also, where a blu-ray disk has such a configuration that the control information is recorded redundantly at five points of an inner circumference control data region such that the five pieces of control information are spaced apart from each other in the radial direction of the blu-ray disk, the usage right information also may be recorded at five points by synchronizing with those five pieces of control information. In this case, tolerance properties with regard to defects of the disk such as scratches, dust, or fingerprints can be improved. However, in the above case, the five pieces of usage right information should be deleted for one use of the content information by the user.

Figure 4:
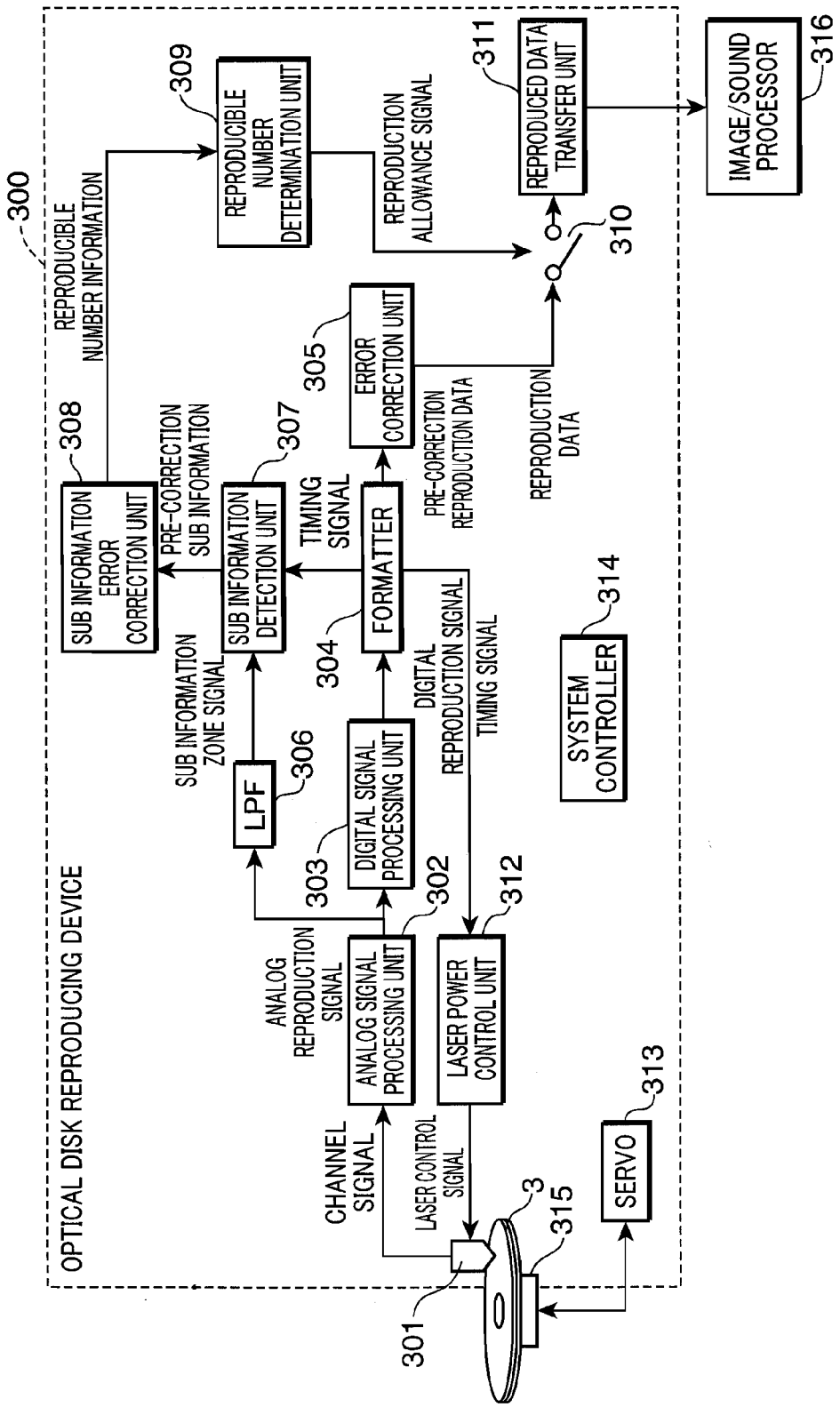
FIG. 4 is a block diagram illustrating a configuration of an optical disk reproducing device according to the present embodiment for the use of a content information usage number limit.

The optical disk reproducing device in which the reproduction number of the content information recorded in the optical disk is limited will now be described exemplifying another optical disk according to the embodiment of the invention. FIG. 4 is a block diagram illustrating a configuration of the optical disk reproducing device according to the present embodiment used in limiting the number of times of use of the content information.

An optical disk reproducing device 300 of FIG. 4 includes: an optical head 301; an analog signal processing unit 302; a digital signal processing unit 303; a formatter 304; an error correction unit 305; a LPF (low-pass filter) 306; a sub information detection unit 307; a sub information error correction unit 308; a reproducible number determination unit 309; a switch 310; a reproduced data transfer unit 311; a laser power control unit 312; a servo 313; a system controller 314; and a spindle motor 315.

The optical head 301 irradiates laser light onto an optical disk 3, detects the concave/convex recording marks recording the content information or the managing information recorded in a control data region of the optical disk 3 based on the reflected light intensity, and generates a channel signal according to the reflected light intensity to output it to the analog signal processing unit 302.

The analog signal processing unit 302 shapes the channel signal input from the optical head 301 by amplification and formation thereof into a waveform, generates an analog reproduction signal, and outputs it to the digital signal processing unit 303 and the LPF 306.

The digital signal processing unit 303 quantizes the analog reproduction signal input form the analog signal processing unit 302 by an AD converter, performs center position control of the reproduction signal, extracts signal in the concave/convex recording mark zone, and then generates clock signal synchronizing with the reproduction signal of the concave/convex recording marks by means of a PLL (phase locked loop) circuit. Subsequently, the digital signal processing unit 303 binarizes the thus quantized reproduction signal at a center position extracted by the center position control synchronizing with the clock signal to generate digital reproduction signal, and thereafter outputs the digital reproduction signal to the formatter 304.

The formatter 304 detects uniformly spaced synchronizing patterns of the digital reproduction signal input from the digital signal processing unit 303, divides into regions sectioned by the synchronized patterns as a frame, as well as divides into a sector comprising a plurality of frames by specifying frame positions in accordance with the kinds of synchronizing patterns. Also, the formatter 304 extracts address information given to each of the sectors to form a cluster composed of a plurality of sectors. The thus extracted reproduction data per a cluster unit is output to the error correction unit 305 as pre-correction reproduction data.

The error correction unit 305 extracts reproduction data by performing error correction of the pre-correction reproduction data for every cluster encoded into the error-correction code which is input from the formatter 304, thereby outputting the reproduction data to the switch 310.

The LPF 306 comprises a low-pass filter for extracting not a signal zone of the concave/convex recording marks but a signal zone of the additional marks recorded by changing the reflection coefficient of the reflection film on the concave/convex recording marks from the analog reproduction signal input from the analog signal processing unit 302. The additional marks are recorded in the optical disk 3 with a length of or above three times the length of the longest recording mark of the concave/convex recording marks. Therefore, extraction of only the signal components of the additional marks by the LPF 306 is possible, except for the signal components of the concave/convex recording marks. To the contrary, the digital signal processing unit 303 is provided with a band pass filter for extracting only signal components of the concave/convex recording marks, such that the signal zone of the additional marks will be decayed.

A cutoff frequency of the LPF 306 is set to a frequency zone prior to the following zone of the center position control where center position control of the reproduction signal is performed in the digital signal processing unit 303. Accordingly, stable detection of the signal components of the additional marks can be realized. Also, a pigmented coat to be generally used in the write once media is employed as the reflection film of the optical disk 3 in which the reflection coefficient of the reflection film of the optical disk 3 develops owing to the laser irradiation. Consequently, the region recording the additional marks has a higher reflection coefficient compared to the region where no additional marks are recorded. The LPF 306 is a filter for extracting a region having a higher reflection coefficient due to the additional marks. The signal of which signal components of the additional marks are extracted are output to the sub information detection unit 307 as the sub information zone signal.

As stated above, the LPF 306 decays the signal band components corresponding to the concave/convex recording marks of the reproduction signal as well as extracts the signal band components of the frequency zone lower than the signal band components, namely the signal band components corresponding to the additional marks.

The formatter 304 outputs to the sub information detection unit 307 a timing signal composed of the detected first position of the cluster, the detected first position of the sector, or the address information assigned to the sector, the detection timing of the synchronizing pattern detected per frame unit, and the section signal in which the sub information is recorded by 1 bit.

The sub information detection unit 307 synchronizes with the timing signal input from the formatter 304 to integrate the sub information zone signal input from the LPF 306 for each of the sections represented by the section signal, thereby detecting the sub information by every 1 bit. The sub information detection unit 307 repeatedly performs the processing to detect the sub information by every 1 bit in the region recording the sub information, namely, the region where the additional marks are formed, to detect the entire bits of the sub information, thereby outputting it to the sub information error correction unit 308 as the pre-correction sub information.

The sub information error correction unit 308 performs an error correction of the pre-correction sub information which is input from the sub information detection unit 307 and encoded into the error-correction code, extracts the reproducible number information (usage right information) of the content information recorded in the optical disk 3 as the sub information, and outputs it to the reproducible number determination unit 309.

The reproducible number determination unit 309 determines whether or not one or more reproduction of the content information is possible based on the reproducible number information of the content information as the sub information input from the sub information error correction unit 308. When the reproducible number determination unit 309 determines that one or more reproductions of the content information is possible, it outputs a reproduction allowance signal for allowing the reproduction of the content information to the switch 310. To the contrary, when the reproducible number determination unit 309 determines that the reproducible number is zero, when the sub information error correction unit 308 fails to perform the error correction of the sub information, or when the sub information recorded by the additional marks is not detected, the reproducible number determination unit 309 will not output the reproduction allowance signal.

The switch 310 outputs the reproduction data output from the error correction unit 305 to the reproduced data transfer unit 311 while the reproducible number determination unit 309 outputs the reproduction allowance signal. The reproduction allowance signal output from the reproducible number determination unit 309 is continuously output from the time when the reproducible number determination unit 309 determines that the reproducible number is more than one to the time when the power of the optical disk reproducing device 300 is turned off, the time when the optical disk reproducing device 300 is reset, or the time when the optical disk 3 is ejected from the optical disk reproducing device 300.

The reproduced data transfer unit 311 serves as an interface with an image/sound processor 316 and thus outputs the reproduction data input from the error correction unit 305 together with parity or the like to the image/sound processor 316. The reproduced data transfer unit 311 outputs the reproduction data to the image/sound processor 316 when the reproduction data input from the error correction unit 305 is the content information recorded in the user area of the optical disk 3. Also, when the reproduction data is the managing information recorded in the control data region of the optical disk 3, the reproduced data transfer unit 311 will not output the data but reproduces the content information from the optical disk 3 based on the thus read managing information.

The image/sound processor 316 restores image information and sound information from the reproduction data input from the reproduced data transfer unit 311 to output it to a display device and a speaker, thereby reproducing the content information recorded in the optical disk 3.

The servo 313 generates rotation control signal for adjusting the number of rotations in accordance with positions in the radial direction to output it to the spindle motor 315. The spindle motor 315 adjusts the number of rotations of the optical disk 3 according to the rotation control signal input from the servo 313.

The system controller 314 controls each block of the optical disk reproducing device 300. The system controller 314 outputs an update command for updating the reproducible number information to each of the optical head 301 and the formatter 304.

The optical head 301 moves a laser irradiation position to the inner circumferential side control data region of the optical disk 3 recording the reproducible number information as the additional marks when the optical head 301 receives the update command of the reproducible number information from the system controller 314.

The formatter 304 generates a timing signal representing a section of the first cluster in which the reproducible number information is recorded in the form of the additional marks from the digital reproduction signal to output it to the laser power control unit 312, when it receives the update command of the reproducible number information from the system controller 314.

The laser power control unit 312 outputs a laser control signal for setting the laser intensity to be irradiated onto the optical disk 3 higher than the normal reproduction laser intensity only for the section represented by the timing signal input from the formatter 304.

The optical head 301 irradiates laser light onto the optical disk 3 with the laser intensity higher than the normal reproduction laser intensity in response to the laser control signal input from the laser power control unit 312. It is preferable for the laser intensity to have an intensity sufficiently strong to change the reflection coefficient of the additional marks of the optical disk 3, namely, an intensity at or above the intensity of 5 times the normal reproduction laser intensity.

As described above, the optical head 301 is provided thereon with the concave/convex recording marks for recording the main information, and irradiates the laser light onto the optical disk 3 provided thereon with the additional marks for recording the sub information by changing the reflection coefficient of the reflection film on the concave/convex recording marks. The analog signal processing unit 302 generates reproduction signal based on the reflection light from the optical disk 3. The formatter 304 extracts clock signal (timing signal) synchronizing with the reproduction signal generated by the analog signal processing unit 302. The error correction unit 305 reproduces the main information from the signal band components corresponding to the concave/convex recording marks of the reproduction signal generated by the analog signal processing unit 302 synchronizing with the clock signal extracted by the formatter 304.

The LPF 306 extracts the signal band components corresponding to the additional marks from the reproduction signal generated by the analog signal processing unit 302. The sub information detection unit 307 detects the sub information from the signal band components extracted by the LPF 306 synchronizing with the clock signal extracted by the formatter 304. The sub information error correction unit 308 generates usage right information as to a right to use the content information from the sub information detected by the sub information detection unit 307.

The system controller 314 receives an operation of the user to the content information. The user operates the content information through a not-shown input device. Examples of the not-shown input device include a remote controller, a keyboard, and a mouse, which perform a reproduction operation and a stop operation of the content information. The system controller 314 receives a reproduction operation command and a stop operation command from the not-shown input device.

The reproducible number determination unit 309 determines whether or not the operation received by the system controller 314 is available based on the usage right information generated by the sub information error correction unit 308. The optical head 301, when the reproducible number determination unit 309 determines that the operation is available, irradiates laser light at or above a certain intensity onto the optical disk and thus reproduces the main information and deletes the sub information as well.

Also, the usage right information includes the reproducible number information representing the allowable number of times of reproduction of the content information, and the reproducible number information includes the reproduction allowance information which is recorded for each predetermined recording unit of the main information and represents a unit reproducible number of the times of the content information. The sub information detection unit 307 detects as the sub information the reproduction allowance information recorded in each of the predetermined recording units of the main information. The optical head 301 deletes the reproduction allowance information of a region of the predetermined recording unit after reproducing the unit reproducible number of the content information.

With the above configuration, the region where the laser light is irradiated with an intensity higher than the normal reproduction laser intensity by the optical head 301 has an even reflection coefficient of the reflection film, resulting in deletion of the additional marks. Therefore, the reproducible number information recorded by the additional marks will be updated. In the present embodiment, the inner circumference control data region of the optical disk is provided with the reproduction allowance information for allowing only one reproduction cluster by cluster. Consequently, deletion of the additional marks corresponding to one cluster enables the update of the reproducible number information, in which the one reproducible number is subtracted from the total number of reproducible numbers capable of reproducing the content information.

Also, the region where the laser light of the intensity higher than the normal reproduction laser intensity is irradiated to delete the additional marks will only come to have a higher reflection coefficient in its entirety, such that the reproduction of the managing information and the content information recorded by the concave/convex recording marks will not be affected by the laser irradiation owing to an effect of the center position control.

(Usage Time Limit)

A method of limiting reproduction time of the content information recorded in the optical disk will now be described with an example of further another optical disk according to the embodiment of the invention.

FIG. 5 is a schematic diagram illustrating the optical disk recording the reproducible time information as the usage right information.

An optical disk 4 of FIG. 5 records the managing information for reproducing the optical disk and the usage right information as to the reproduction time of the content information recorded in the optical disk, in an inner circumference side control data region 41 of the optical disk 4. The managing information is recorded by the concave/convex recording marks. The usage right information is recorded by the additional marks of which reflection coefficient of the reflection film is changed by irradiating laser light on the concave/convex recording marks.

The managing information recorded by the concave/convex recording marks in the control data region 41 of the optical disk 4 is recorded in the form of a format including frames as a data unit sectioned by a synchronization code in order to reproduce information, sectors as a data unit each of which includes a plurality of frames and sectioned by address information, and clusters as a data unit each of which includes a plurality of sectors and is encoded into an error-correction code.

The usage right information, which is recorded by changing the reflection coefficient of the reflection film on the concave/convex recording marks in the control data region 41 of the optical disk 4, is recorded so as to synchronize with a data configuration of the concave/convex recording marks, namely, the frames, the sectors, or the clusters. In the present embodiment, the usage right information representing a reproduction allowance for 10 minutes per cluster is recorded. Therefore, the reproducible time information includes a plurality of pieces of reproduction allowance information according to the reproduction time, and the reproduction allowance information for allowing a 10 minute-reproduction is recorded to one cluster. For example, if the content information is reproduced for 30 minutes, the optical disk 4 is provided with three pieces of reproduction allowance information as the reproducible time information recorded therein.

When the user reproduces the content information for 10 minutes, the laser light of the recording intensity is irradiated onto the first one cluster recording the usage right information to thereby change the reflection coefficient of the reflection film in the first cluster, resulting in deleting the additional marks. As such, the reproduction allowance information corresponding to 10 minutes will be deleted.

In the present embodiment, the usage right information includes the reproduction allowance information for allowing the reproduction of the content information for a predetermined time by the number of pieces of the reproduction allowance information corresponding to the time for allowing the reproduction of the content information. Then, the plurality of pieces of the reproduction allowance information is deleted piece by piece every time the content information is reproduced for a predetermined time.

As described above, since the optical disk according to the present embodiment is provided thereon with the additional marks by changing the reflection coefficient of the reflection film synchronizing with a data configuration of the concave/convex recording marks, no additional synchronization code or the like is required in order to reproduce the additional marks, resulting in that the additional marks can be reproduced according to the data configuration of the concave/convex recording marks upon reproducing the concave/convex recording marks.

Also, every time the content information is reproduced for 10 minutes, the reproduction allowance information for allowing a 10-minute reproduction as the usage right information recorded as the additional marks is deleted and thus the usage right information is updated. Accordingly, the optical disk capable of managing the reproduction time of the content information can be realized.

Figure 6:
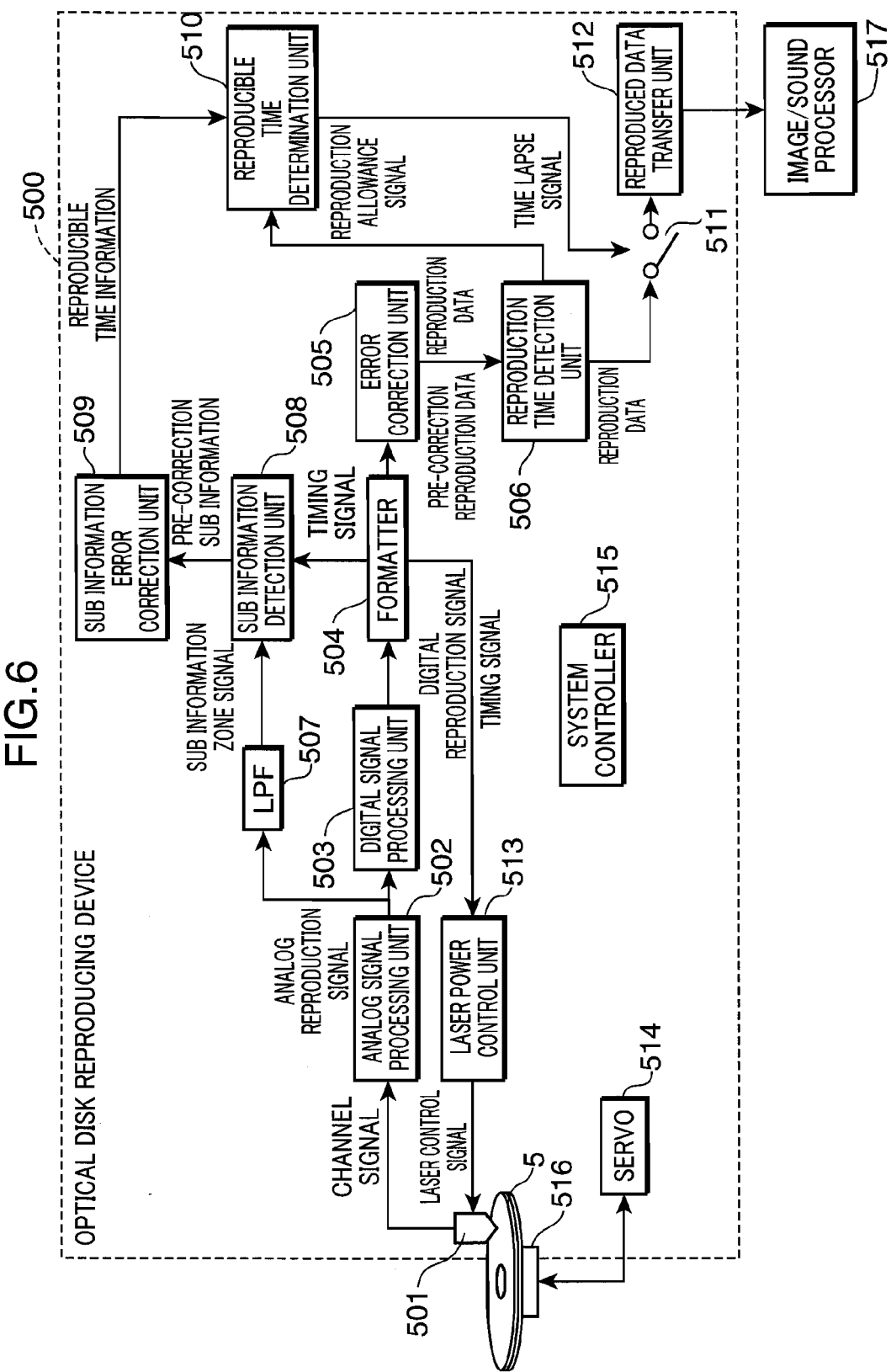
FIG. 6 is a block diagram illustrating an optical disk reproducing device according to the present embodiment for the use of content information usage time limit.

An optical disk reproducing device for limiting the reproduction time of the content information recorded in the optical disk will now be described exemplifying the optical disk according to the present embodiment. FIG. 6 is a block diagram illustrating a configuration of the optical disk reproducing device according to the embodiment for the use of usage time limit of the content information.

An optical disk reproducing device 500 of FIG. 6 includes: an optical head 501; an analog signal processing unit 502; a digital signal processing unit 503; a formatter 504; an error correction unit 505, a reproduction time detection unit 506; a LPF 507; a sub information detection unit 508; a sub information error correction unit 509; a reproducible time determination unit 510; a switch 511, a reproduced data transfer unit 512; a laser power control unit 513; a servo 514; a system controller 515; and a spindle motor 516.

The optical head 501 irradiates laser light onto an optical disk 5 to detect the concave/convex recording marks recording the content information or the managing information recorded in the control data region of the optical disk 5 based on the light reflection intensity of the laser light, thereby generating a channel signal in response to the light reflection intensity to output it to the analog signal processing unit 502.

The analog signal processing unit 502 shapes the channel signal input from the optical head 501 by amplification and formation thereof into a waveform, generates an analog reproduction signal, and outputs it to the digital signal processing unit 503 and the LPF 507.

The digital signal processing unit 503 quantizes the analog reproduction signal input from the analog signal processing unit 502 by means of an AD converter, performs center position control of the reproduction signal, and extracts signal of the concave/convex recording mark zone, thereby generating clock signal synchronizing with the reproduction signal of the concave/convex recording marks through a PLL circuit. Then, the digital signal processing unit 503 generates digital reproduction signal by binarizing the reproduction signal having been quantized synchronizing with the clock signal at a center position extracted by the center position control to output it to the formatter 504.

The formatter 504 detects synchronizing patterns assigned to the uniformly spaced digital reproduction signal input from the digital signal processing unit 503 as well as divides the regions sectioned by the synchronized pattern one by one as a frame, and divides a sector comprising a plurality of frames by specifying frame positions according to the kinds of synchronizing patterns. Also, the formatter 504 extracts the address information assigned to every sector to divide it into clusters each comprising a plurality of sectors. Thus extracted reproduction data per cluster unit is output to the error correction unit 505 as the pre-correction reproduction data.

The error correction unit 505 performs an error correction of the pre-correction reproduction data for each cluster which is input from the formatter 504 and is encoded into an error-correction code to extract the reproduction data, thereby outputting it to the reproduction time detection unit 506.

The reproduction time detection unit 506 detects a reproduction time in which the content information was reproduced. More specifically, the reproduction time detection unit 506, upon detecting the reproduction time, measures the time while the reproduction data is output from the error correction unit 505. Alternatively, the reproduction time detection unit 506 counts the number of clusters divided in the formatter 504 to calculate the time corresponding to the number of clusters extracted as the reproduction data. Further, alternatively, the reproduction time detection unit 506 extracts a reproduction position (time) information representing a reproduction start position (time) and a reproduction end position (time) to thereby calculate the reproduction time. Also, the reproduction time detection unit 506 generates time lapse signal for every 10-minute reproduction of the content information to output it to the reproducible time determination unit 510. Further, the reproduction time detection unit 506 outputs the reproduction data to the switch 511.

The LPF 507 comprises a low pass filter which extracts a signal zone of the additional marks recorded by changing the reflection coefficient of the reflection film on the concave/convex recording marks from the analog reproduction signal input from the analog signal processing unit 502 and not a signal zone of the concave/convex recording marks. The additional marks are recorded in the optical disk 5 with a length at least three times the length of the longest recording mark among the concave/convex recording marks. Therefore, the LPF 507 can extract only the signal components of the additional marks, excluding the signal components of the concave/convex recording marks. On the other hand, the digital signal processing unit 503 is provided with a band pass filter which extracts only the signal components of the concave/convex recording marks, such that the signal zone of the additional marks will be decayed.

The cut-off frequency of the LPF 507 is set to a frequency zone prior to the following zone of the center position control in which the digital signal processing unit 503 performs center position control of the reproduction signal. Accordingly, stable detection of the signal components of the additional marks will be achieved. Also, a pigmented coat generally used in write once media will be employed as the reflection film of the optical disk 5 of which reflection coefficient will improve owing to the laser irradiation. Therefore, a higher reflection coefficient will be detected in the region recording the additional marks compared to the region where no additional marks are recorded. The LPF 507 is a filter for extracting a region having higher a reflection coefficient by the additional marks. The signal having extracted the signal components of the additional marks will be output to the sub information detection unit 508 as the sub information zone signal.

The formatter 504 outputs to the sub information detection unit 508 a timing signal composed of the detected first position of the cluster, the detected first position of the sector, or the address information assigned to the sector, the detection timing of the synchronizing pattern detected per frame unit, and the section signal in which the sub information is recorded by 1 bit. The sub information detection unit 508 integrates the sub information zone signal input from the LPF 507 for every section represented by the section signal synchronizing with the timing signal input from the formatter 504 to thereby detect the sub information for every 1 bit. The sub information detection unit 508 repeats the processing for detecting the sub information for every 1 bit in a region where the sub information is recorded, namely, a region where the additional marks are formed, to thereby detect the sub information corresponding to the entire bits, resulting in outputting it as the pre-correction sub information to the sub information error correction unit 509.

The sub information error correction unit 509 performs error correction of the pre-correction sub information which was encoded into the error-correction code and input from the sub information detection unit 508 and extracts the reproducible time information (usage right information) of the content information recorded in the optical disk 5 as the sub information to output it to the reproducible time determination unit 510.

The reproducible time determination unit 510 includes therein a memory to store in the memory the reproducible time information recorded by the additional marks in the optical disk 5 as the sub information as well as deletes from the memory the reproduction allowance information for allowing a 10 minute-reproduction contained in the reproducible time information in accordance with a time lapse signal from the reproduction time detection unit 506. The reproducible time determination unit 510 determines whether or not reproduction of the content information for a predetermined time, namely, more than 10 minutes, is available on the basis of the reproducible time information of the content information input as the sub information from the sub information error correction unit 509. When the reproducible time determination unit 510 determines that the memory contains the reproducible time information and therefore the reproduction of the content information for more than 10 minutes is available, it outputs a reproduction allowance signal to the switch 511 in order to allow the reproduction of the content information. On the other hand, when the reproducible time determination unit 510 determines that the memory contains no reproducible time information and therefore the reproduction of the content information for more than 10 minutes is not available, when the sub information correction unit 509 fails to perform the error correction of the sub information, or when the sub information recorded by the additional marks is not detected, the reproducible time determination unit 510 will not output the reproduction allowance signal.

The switch 511 continues to output reproduction data of which reproduction time was detected by the reproduction time detection unit 506 to the reproduced data transfer unit 512 while the reproducible time determination unit 510 is outputting the reproduction allowance signal. The switch 511 prohibits the output of the reproduction data when the optical disk 5 is ejected from the optical disk reproducing device 500, when the optical disk reproducing device 500 is reset, or when the power switch of the optical disk reproducing device 500 is turned off.

The reproduced data transfer unit 512 serves as the interface with an image/sound processor 517 and outputs the reproduction data input from the reproduction time detection unit 506 together with a parity or the like to the image/sound processor 517. The reproduced data transfer unit 512 outputs the reproduction data to the image/sound processor 517 when the reproduction data input from the reproduction time detection unit 506 is the content information recorded in the user area of the optical disk 5. The reproduced data transfer unit 512 will not output the data when the reproduction data is the managing information recorded in the control data region of the optical disk 5, but will reproduce the content information from the optical disk 5 based on the thus read managing information.

The image/sound processor 517 restores the image information and the sound information from thus input reproduction data to output it to the display device and the speaker respectively, thereby reproducing the content information recorded in the optical disk 5.

The servo 514 generates a rotation control signal for adjusting the number of rotations according to the positions in the radial direction to output it to the spindle motor 516. The spindle motor 516 adjusts the number of rotations of the optical disk 5 in accordance with the rotation control signal input from the servo 514.

The system controller 515 controls each of the blocks of the optical disk reproducing device 500. The system controller 515 outputs an update command for updating the reproducible time information to the optical head 501 and the formatter 504 when the reproduction time detection unit 506 detects that the content information was reproduced for 10 minutes.

The optical head 501 moves a laser irradiation position to an inner circumference control data region of the optical disk 5 where the reproducible time information is recorded in the form of the additional marks when it receives the update command of the reproducible time information from the system controller 515.

The formatter 504 generates from the digital reproduction signal a timing signal representing a section of the first cluster recording the reproducible time information in the form of the additional marks when it receives the update command of the reproducible time information from the system controller 515 to output it to the laser power control unit 513.

The laser power control unit 513 outputs to the optical head 501 a laser control signal for setting the laser light irradiation intensity to be irradiated onto the optical disk 5 to an intensity higher than the normal reproduction laser light intensity only for a section represented by the timing signal input from the formatter 504.

The optical head 501 irradiates the laser light onto the optical disk 5 at a laser light irradiation intensity higher than the normal reproduction laser light intensity in response to the laser control signal input from the laser power control unit 513. The laser light intensity is preferably more than 5 times larger than the normal reproduction laser light intensity, namely, the intensity sufficient to change the reflection coefficient of the additional marks of the optical disk 5.

As described above, the usage right information contains the reproducible time information representing an allowable time to reproduce the content information, and the reproducible time information includes the reproduction allowance information which is recorded for every predetermined recording unit of the main information and represents the unit reproducible time of the content information. The sub information detection unit 508 detects the reproduction allowance information as the sub information which is recorded for every predetermined recording unit of the main information. The optical head 501 deletes the reproduction allowance information of the region of the predetermined recording unit after reproducing the unit reproducible time of the content information.

With the above described configuration, the region where the laser light at an intensity higher than the normal reproduction laser light intensity is irradiated by the optical head 501 will have a uniform reflection coefficient of the reflection film, resulting in deletion of the additional marks. Therefore, the reproducible time information recorded by the additional marks will be updated. In the present embodiment, the reproduction allowance information for allowing a 10 minute-reproduction is recorded in every cluster in the inner circumference control data region of the optical disk. Therefore, deletion of the additional marks corresponding to one cluster will enable the update of the reproducible time information in which the 10-minute reproducible time is subtracted from the total reproducible time capable of reproducing the content information.

Also, the region where the additional marks are deleted by irradiating the laser light at an intensity higher than the normal reproduction laser light intensity will only have the higher reflection co efficiency in its entirety, such that reproduction of the managing information and the content information recorded by the concave/convex recording marks will not be affected owing to an effect of the center position control.

(Prepaid Type Billing Control)

A method of controlling billing of the usage fee of the content information recorded in the optical disk will now be described exemplifying another optical disk according to the present embodiment of the invention.

Figure 7:
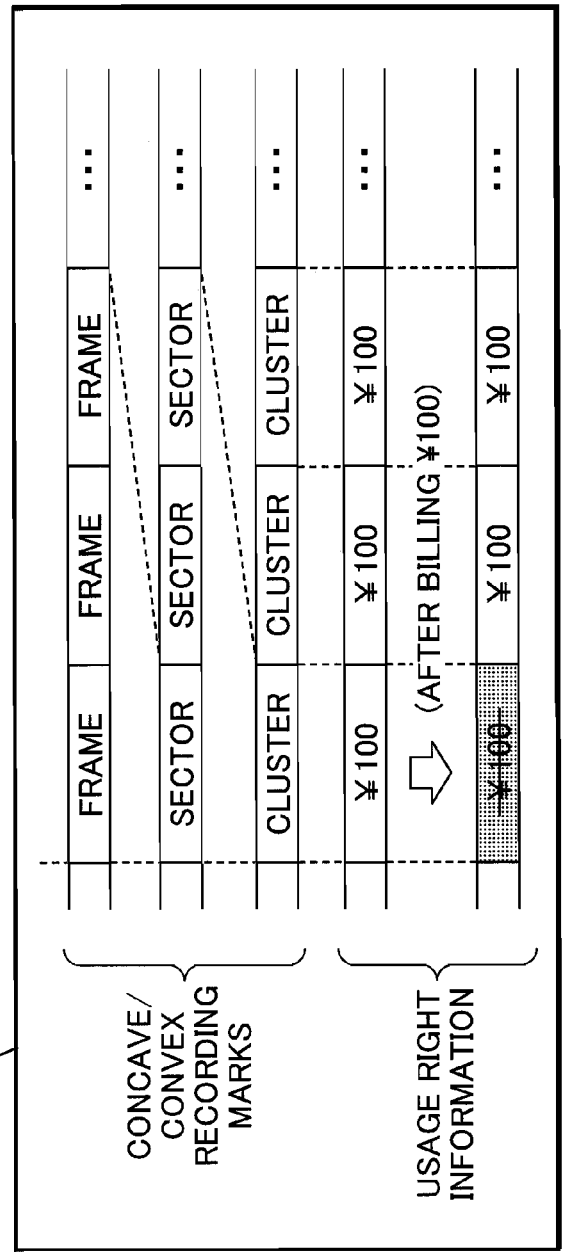
FIG. 7 is a schematic diagram illustrating the optical disk recording prepaid money amount information as the usage right information.

FIG. 7 is a schematic diagram illustrating an optical disk recording prepaid money amount information as the usage right information.

An optical disk 6 of FIG. 7 records in an inner circumference control data region 61 of the optical disk managing information for reproducing the optical disk and usage right information as to billing of the usage fee of the content information recorded in the optical disk. The managing information is recorded by the concave/convex recording marks. The usage right information is recorded by the additional marks by irradiating the laser light onto the concave/convex recording marks to change the reflection coefficient of the reflection film.

The managing information recorded by the concave/convex recording marks in the control data region 61 of the optical disk 6 is formed into a format including frames as a data unit sectioned by a synchronization code in order to reproduce the information, the sectors as a data unit each of which is composed of a plurality of frames and is sectioned by the address information, and clusters as a data unit each of which is composed of a plurality of sectors and encoded into the error-correction code.

The usage right information recorded by changing the reflection coefficient of the reflection film on the concave/convex recording marks of the control data region 61 of the optical disk 6 is recorded so as to synchronize with a data configuration of the concave/convex recording marks, namely, the frames, the sectors, and the clusters. In the present embodiment, the usage right information representing a money amount of 100 Japanese yen is recorded per cluster unit. Therefore, the usage right information contains a plurality of pieces of prepaid money amount information according to an available money amount and the prepaid money amount information of 100 Japanese yen is recorded for one cluster. For example, the optical disk 6 records as the usage right information five pieces of prepaid money amount information when use of the content information consisting with 500 Japanese yen is allowed.

When the user purchases (downloads) the content information, the laser light at the recording intensity is irradiated onto the predetermined number of clusters recording the usage right information based on billing information of the thus purchased content information to change the reflection coefficient of the reflection film in the predetermined number of clusters, thereby deleting the additional marks. Accordingly, the prepaid money amount information is also deleted. FIG. 7 illustrates a situation that the user downloads the content information corresponding to 100 Japanese yen and thereby the prepaid money amount information corresponding to 100 Japanese yen is deleted from the preliminarily recorded prepaid money amount information of the predetermined money amount information.

In the present embodiment, the usage right information contains the prepaid money amount information corresponding to 100 Japanese yen for the number corresponding to the money amount to which the download of the content information is allowed. Every time the content information is downloaded, the number of prepaid money amount information corresponding to the money amount corresponding to the content information is deleted.

As described above, the optical disk according to the present embodiment requires no additional synchronization code or the like for reproducing the additional marks since the additional marks are formed by changing the reflection coefficient of the reflection film synchronizing the data configuration of the concave/convex recording marks, such that the additional marks can also be reproduced according to the data configuration of the concave/convex recording marks upon reproduction of the concave/convex recording marks.

Also, the prepaid money amount information as the usage right information recorded in the form of the additional marks is deleted every time the user purchases the content information according to the billing information of the thus purchased content information to update the usage right information. Therefore, a safe billing procedure can be realized with regard to purchase of the content information only with the optical disk 6 without using a credit card or a prepaid card.

Figure 8:
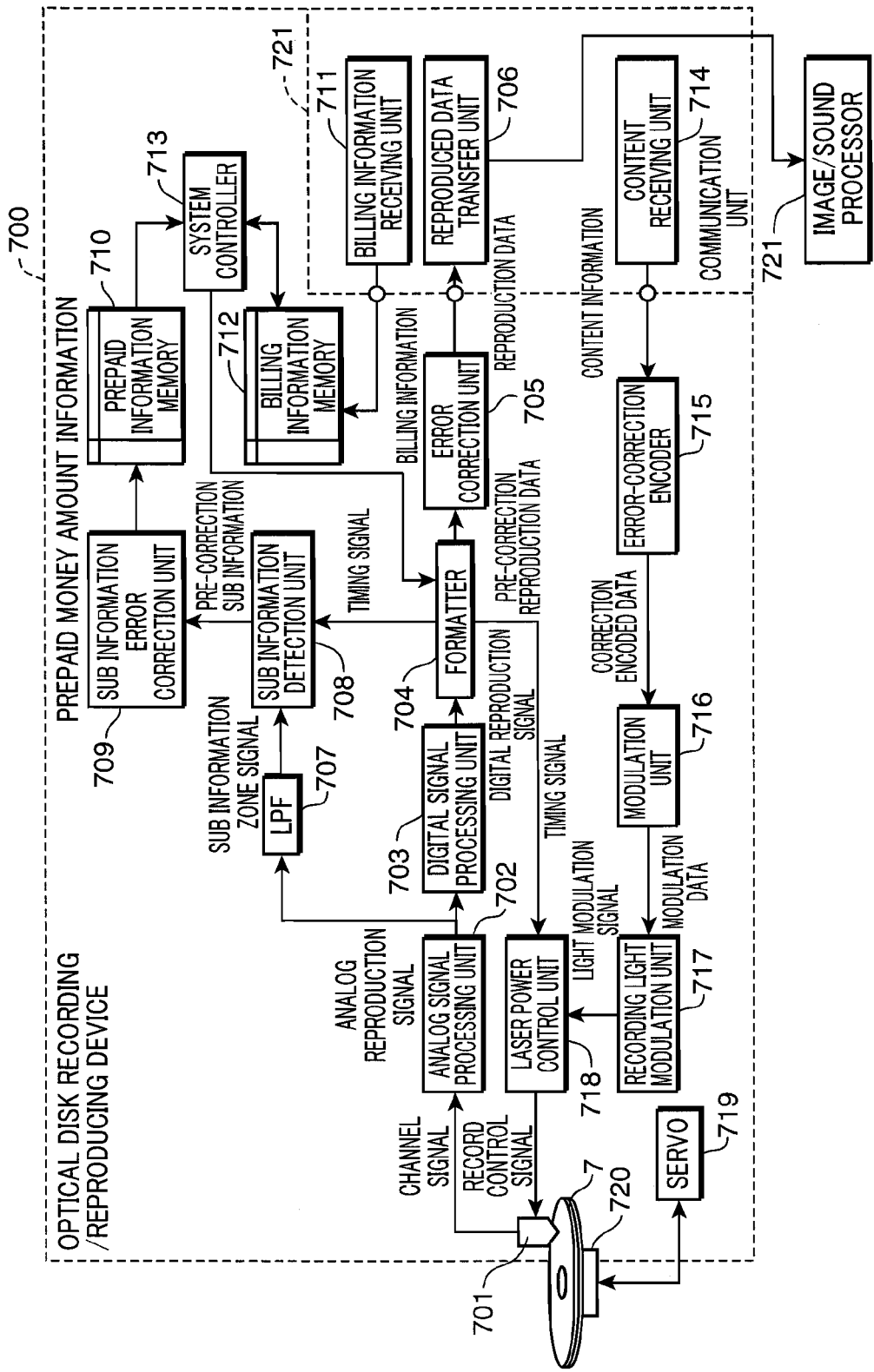
FIG. 8 is a block diagram illustrating a configuration of an optical disk record reproducing device according to the present embodiment for the use of a billing control of the content information.

An optical disk reproducing device in which billing of the usage fee of the content information recorded in the optical disk will now be described exemplifying further another optical disk according to the embodiment of the present invention. FIG. 8 is a block diagram illustrating a configuration of the optical disk recording/reproducing device according to the present embodiment used in a billing control of the content information.

The optical disk recording/reproducing device 700 of FIG. 8 includes: an optical head 701; an analog signal processing unit 702; a digital signal processing unit 703; a formatter 704; an error correction unit 705; a LPF 707; a sub information detection unit 708; a sub information error correction unit 709; a prepaid information memory 710; a billing information memory 712; a system controller 713; an error-correction encoder 715; a modulation unit 716; a recording light modulation unit 717; a laser power control unit 718; a servo 719; and a spindle motor 720.

Also, the optical disk recording/reproducing device 700 is connected to a communication unit 721, and the communication unit 721 includes a reproduced data transfer unit 706, a billing information receiving unit 711, and a content receiving unit 714.

The optical head 701 moves a laser light irradiation position to an inner circumference side control data region of the optical disk 7 where managing information recorded by the concave/convex recording marks and usage right information recorded by the additional marks in which the reflection coefficient of the reflection film on the concave/convex recording marks is changed are recorded, irradiates laser light onto the optical disk 7, and generates a channel signal according to an intensity variation involved in irradiation of the laser light to output it to the analog signal processing unit 702.

The analog signal processing unit 702 shapes the channel signal input from the optical head 701 by amplification thereof or formation thereof into a waveform to generate an analog reproduction signal, resulting in outputting it to both of the digital signal processing unit 703 and the LPF 707.

The digital signal processing unit 703 quantizes the analog reproduction signal input from the analog signal processing unit 702 by means of an AD converter, performs a center position control of the reproduction signal, and extracts signal of the concave/convex recording mark zone as well, to thereafter generate clock signal synchronizing with the reproduction signal of the concave/convex recording marks through a PLL circuit. Also, the digital signal processing unit 703 binarizes the thus quantized reproduction signal synchronizing with the clock signal at a center position extracted by the center position control to thereby generate digital reproduction signal for outputting to the formatter 704.

The formatter 704 detects a synchronizing pattern assigned to the digital reproduction signal input from the digital signal processing unit 703 in a uniformly spaced manner and divides the region sectioned by the synchronizing pattern into frames as well as divides them into a sector comprising a plurality of frames by specifying frame positions according to the kinds of synchronizing patterns. Also, the formatter 704 extracts address information assigned to every sector to divide it into a cluster comprising a plurality of sectors. The thus extracted reproduction data per cluster unit is output to the error correction unit 705 as pre-correction reproduction data.

The error correction unit 705 performs an error correction of the pre-correction reproduction data for every cluster which has been encoded into an error correction code and input from the formatter 704, thereby extracting the reproduction data in order to output it to the reproduced data transfer unit 706.

The reproduced data transfer unit 706 serves as an interface with the image/sound processor 722 and to output the reproduction data input from the error correction unit 705 together with a parity or the like to the image/sound processor 722. The reproduced data transfer unit 706 outputs the reproduction data to the image/sound processor 722 when the reproduction data input from the error correction unit 705 is the content information recorded in the user area of the optical disk 7. When the reproduction data is the managing information recorded in the control data region, the reproduced data transfer unit 706 will not output the data but reproduces the content information from the optical disk 7 based on the thus read managing information.

The image/sound processor 722 restores image information and sound information from the reproduction data input from the reproduced data transfer unit 706 to output it to a display device and a speaker, resulting in reproducing the content information recorded in the optical disk 7.

The LPF 707 comprises a low pass filter which extracts, from the analog reproduction signal input from the analog signal processing unit 702, not reproduction zone signal components of the concave/convex recording marks of the optical disk 7 but reproduction zone signal components of the additional marks recorded such that the reflection coefficient of the reflection film on the concave/convex recording marks are changed. The additional marks are recorded in a zone away from the recording zone of the concave/convex recording marks such that it can be isolated from a signal zone of the concave/convex recording marks. Therefore, it is preferable that a length of the additional marks is a length of about three times the length of the longest recording mark of modulated concave/convex recording marks.

Also, since center position control of the analog reproduction signal is performed in the digital signal processing unit 703, if the additional marks of which the reflection coefficient of the reflection film is changed is too long, the additional marks cannot be detected correctly since a center position of the reproduction signal follows with a portion where the reflection coefficient is changed. Accordingly, the additional marks are recorded at a frequency zone higher than the following zone of the center position control of the reproduction signal. Consequently, the cut-off frequency of the LPF 707 is required to be set to a frequency zone behind the frequency zone specified by the largest mark/space of the concave/convex recording marks and prior to the following zone of the center position control of the optical disk recording/reproducing device.

The formatter 704 outputs to the sub information detection unit 708 a timing signal comprising the detected first position of the cluster, the detected first position of the sector, or the address information assigned to the sector, the detection timing of the synchronizing pattern detected by a frame unit, and a section signal recording the sub information by 1 bit. The sub information detection unit 708 integrals the sub information zone signal input from the LPF 707 for every section represented by the section signal synchronizing with the timing signal input from the formatter 704 to detect the sub information for every 1 bit. The sub information detection unit 708 repeats the processing for detecting the sub information for every 1 bit in the region recording the sub information, namely, the region where the additional marks are formed to detect the sub information corresponding to the entire bits, resulting in outputting it to the sub information correction unit 709 as pre-correction sub information.

The sub information error correction unit 709 performs an error correction of the pre-correction sub information which is input from the sub information detection unit 708 and encoded into an error-correction code to extract prepaid money amount information (usage right information) as the sub information representing an available money amount of the content information recorded in the disk 7, thereby outputting it to the prepaid information memory 710.

The prepaid information memory 710 comprises a general volatile memory which primary stores the prepaid money amount information input from the sub information error correction unit 709.

As described above, the prepaid money amount information recorded in the form of the additional marks is read by changing the reflection coefficient of the reflection film on the concave/convex recording marks concurrently with the timing when managing information recorded in the form of concave/convex recording marks in the control data region of the optical disk 7 is read to primary store it in the prepaid information memory 710. Accordingly, the optical disk 7 is activated.

After the optical disk 7 is activated, the user selects the content information he/she wishes to download through a not-shown user interface unit. After the user selects the content information, a not-shown WEB server notifies billing information of the content information the user selected through a network. The billing information includes the cost of the content information selected by the user.

The billing information receiving unit 711 receives the billing information notified from the WEB server to output it to the billing information memory 712.

The billing information memory 712 comprises a general volatile memory and primary stores the billing information input from the billing information receiving unit 711.

The system controller 713 subtracts a money amount represented by the billing information stored in the billing information memory 712 from a money amount represented by the prepaid money amount information stored in the prepaid information memory 710 when the prepaid money amount information has been read from the optical disk 7 to the prepaid information memory 710 and when the billing information memory 712 has received the billing information from the WEB server.

The system controller 713 determines whether or not the subtracted result in which the money amount represented by the billing information is subtracted from the prepaid money amount information becomes a negative integer. Here, if the system controller 713 determines that the subtracted result becomes a negative integer, it ends the processing by outputting an error before the optical disk recording/reproducing device downloads the content information since the billing is not capable. On the other hand, if the system controller 713 determines that the subtracted result does not become a negative integer (becomes a positive integer), it updates the prepaid information memory 710 to reflect the subtracted result since the billing procedure is available for the content information the user selected.

The system controller 713 transmits billing procedure end identification information representing that the billing procedure has completed to a not-shown WEB server through the communication unit 721 after updating the content of the prepaid information memory 710. The content receiving unit 714 starts downloading of the content information the user selected.

The content receiving unit 714 receives content information to be downloaded from the WEB server to output the thus received content information to the error-correction encoder 715.

The error-correction encoder 715 performs error-correction encoding for every predetermined unit of the content information to output it as correction encoded data to the modulation unit 716. The error-correction encoder 715 is a block paired with the error correction unit 705 and uses an error-correction encoding method as well as the error correction unit 705.

The modulation unit 716 modulates the encoded correction data input from the error-correction encoder 715. The modulation unit 716 performs a modulation specified by a physical standard of the optical disk 7 to be used. For example, an 8-16 modulation is performed for DVDs and a 17PP modulation is performed for blu-ray disks. The thus modulated correction encoded data is output to the recording light modulation unit 717 as modulation data.

The recording light modulation unit 717 generates a light modulation signal as the timing signal for irradiating the recording laser light on the basis of the modulation data input from the modulation unit 716 to output it to the laser power control unit 718. The light modulation signal is a recording pulse for which recording compensation has been carried out for the sake of formation of stable concave/convex recording marks on the optical disk 7.

The laser power control unit 718 generates a record control signal for controlling the laser power of the laser light to be irradiated onto the optical disk 7 based on the light modulation signal input from the recording light modulation unit 717. Thus generated record control signal is output to the optical head 701.

The optical head 701 irradiates the laser light onto the optical disk 7 on the basis of the record control signal input from the laser power control unit 718 to record the content information having been downloaded to the user area of the optical disk 7.

As described above, the downloaded content information is recorded to the user area of the optical disk 7 as a result of the billing procedure with regard to the usage fee of the content information based on the prepaid money amount information read from the optical disk 7.

The present embodiment exemplified a case where the optical disk for reading the prepaid money amount information also serves as the recording medium for recording the content information; however, the present invention is not limited to such a configuration. For example, such a configuration is also employable that, a replacement of the optical disk to the other one is notified to the user at a time when the prepaid money amount information was read, the content information having been downloaded may be recorded onto the optical disk after the optical disk is replaced to the other one. Also, such a configuration is employable that, if the optical disk recording/reproducing device 700 has two optical disk drives, the prepaid money amount information is read from a first optical disk and the content information having downloaded onto a second optical disk is recorded. Further, the second optical disk is not limited to the optical disk but may be, for example, a hard disk drive or a semiconductor memory.

The system controller 713, when the downloaded content information is written onto the optical disk 7, calculates the number of clusters of which additional marks are to be deleted based on the prepaid money amount information as a result of the subtraction result stored in the prepaid information memory 710. In the present embodiment, since the prepaid money amount information for 100 Japanese yen is recorded for one cluster, the prepaid money amount information corresponding to 5 clusters will be deleted by billing 500 Japanese yen and the prepaid money amount information corresponding to 10 clusters will be deleted by billing 1,000 Japanese yen.

The present embodiment exemplifies, but is not limited to, the prepaid money amount information of 100 Japanese yen for one cluster. For example, each of the address values corresponding to the respective clusters may record prepaid money amount information of different money amounts. Also, the prepaid money amount information is recorded by a sector unit including addresses or a frame unit sectioned by the synchronization code instead of the cluster unit.

Subsequently, the system controller 713 notifies to the formatter 704 an additional mark deletion command including the number of clusters which is found in calculation to be deleted.

The formatter 704 reproduces a managing information storage region in the control data region of the optical disk when it receives the additional mark deletion command from the system controller 713 and generates the timing signal representing a section including the notified number of clusters from the first cluster recording the additional marks to output it to the laser power controlling unit 718.

The laser power control unit 718 sets the laser power at an intensity sufficient to change the reflection coefficient of the reflection film of the optical disk 7 in an output section of the timing signal input from the formatter 704 to irradiate the laser light onto the optical disk 7. Accordingly, the additional marks, which are formed such that the reflection coefficient of the reflection film on the concave/convex recording marks is preliminarily changed, are deleted. According to the present embodiment, for example, the additional marks corresponding to five clusters will be deleted with regard to the billing of 500 Japanese yen. In this way, the prepaid money amount information preliminarily recorded in the optical disk 7 will be deleted for the billed money amount, such that a stable billing procedure can be carried out with regard to the downloaded content information.

As described above, the usage right information contains the money amount information representing the money amount available for the billing procedure to be taken to when the user obtains the content information, and the money amount information includes the prepaid money amount information which is recorded for every predetermined recording unit of the main information and represents a predetermined unit of money amount. The sub information detection unit 708 detects as the sub information the prepaid money amount information recorded for every predetermined recording unit of the main information. The billing information receiving unit 711 obtains the billing information representing the money amount to be billed for the content information. The system controller 713 subtracts the money amount represented by the billing information obtained by the billing information receiving unit 711 from the money amount represented by the prepaid money amount information detected by the sub information detection unit 708 to determine the section containing the sub information to be deleted on the basis of the subtraction result. Then, the optical head 701 deletes the sub information corresponding to the section determined by the system controller 713.

As described above, the optical disk recording/reproducing device 700 according to the present embodiment reads the prepaid money amount information recorded in the form of the additional marks at a time of actuating the optical disk 7 to thereby calculate the number of clusters to be deleted based on the billing information of the downloaded content information, resulting in that the additional marks corresponding to the thus calculated number of clusters are deleted to carry out the billing procedure for the optical disk medium of its own.

Figure 9:
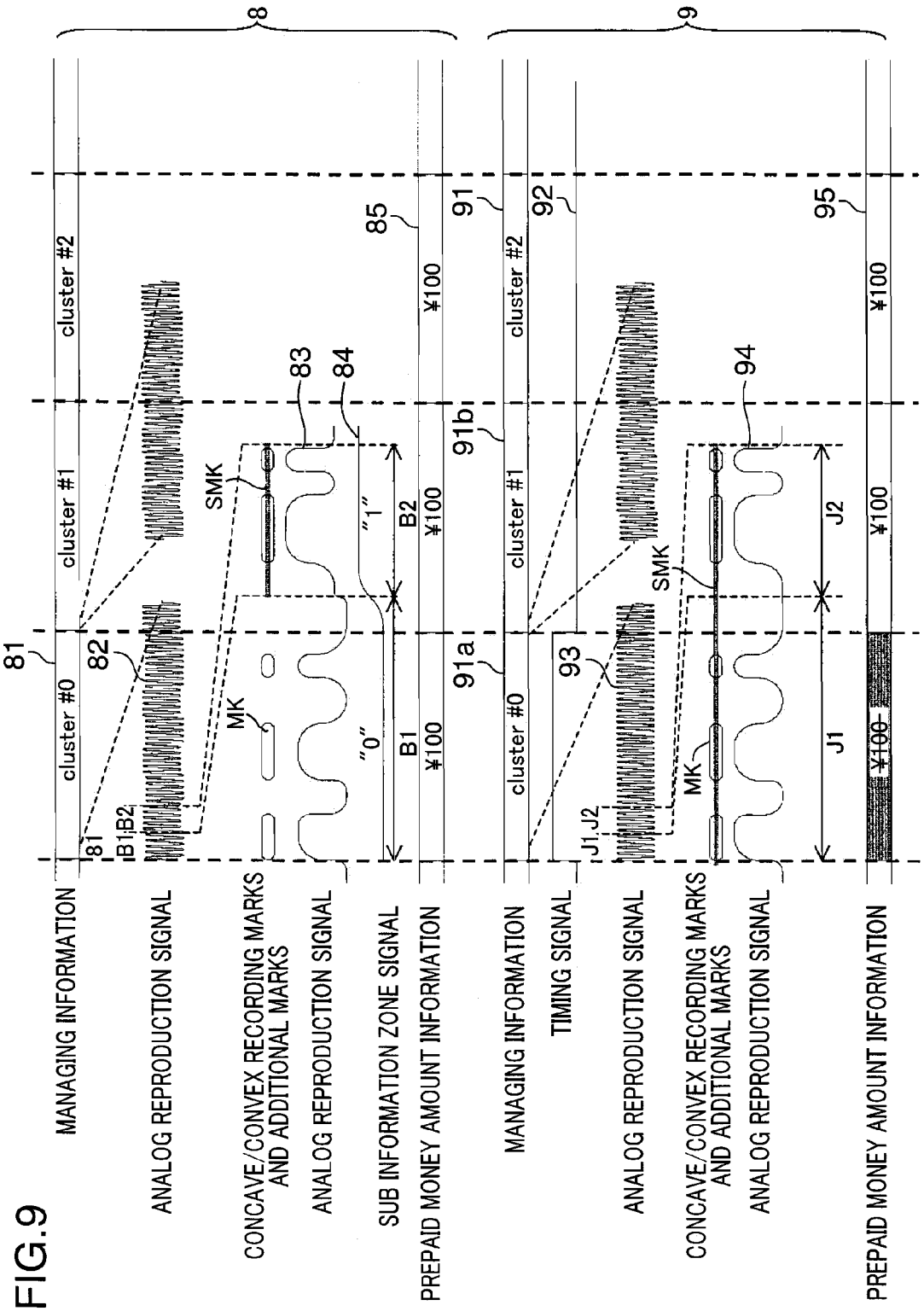
FIG. 9 is a timing chart illustrating an operation of the optical disk record reproducing device according to the present embodiment before and after a billing procedure.

Operations of an optical disk recording/reproducing device 700 according to the present embodiment will now be described. FIG. 9 is timing charts illustrating operations of the optical disk recording/reproducing device according to the present embodiment before and after the billing procedure.

A timing chart 8 of FIG. 9 illustrates an operation to read the prepaid money amount information from the optical disk 7 before the billing procedure; and a timing chart 9 of FIG. 9 illustrates an operation to read the prepaid money amount information from the optical disk 7 after the billing procedure is carried out for 100 Japanese yen.

Firstly, the timing chart 8 when reproducing the prepaid money amount from the optical disk before the billing procedure will be described below.

The optical disk recording/reproducing device 700 reads the managing information of the inner circumference control data region of the optical disk 7 and reads the prepaid money amount information from the additional marks formed by changing the reflection coefficient of the reflection film on the concave/convex recording marks of the managing information as well at a time of actuating the optical disk 7. As for the managing information 81 recorded by the concave/convex recording marks, the clusters encoded into the error-correction code are continuously arranged circumferentially.

An analog reproduction signal 82 of the concave/convex recording marks recording the managing information 81 includes a section B1 in which the concave/convex recording marks are reproduced by a standard reflection coefficient since the additional marks are not formed thereon and a section B2 in which the concave/convex recording marks are reproduced by a reflection coefficient different from the standard reflection coefficient since the additional marks are formed thereon, because the additional marks is formed by changing the reflection coefficient of the reflection film on the concave/convex recording marks.

Enlargement of the sections B1 and B2 will show that the section B1 only includes the concave/convex recording marks MK and the section B2 includes the concave/convex recording marks MK of which reflection coefficient of the reproduction signal is changed since the additional marks SMK are formed thereon. Also, the additional marks SMK are recorded in a zone lower than the recording zone of the concave/convex recording marks MK. Therefore, the length of the additional marks becomes longer than the longest length of the concave/convex recording marks.

An analog reproduction signal 83 is a reproduction signal which reproduces the concave/convex recording marks MK in the section B1 and the additional marks SMK in the section B2. The reproduction signal is extracted at the normal reflection coefficient in the section B1 in which only the concave/convex recording marks MK are recorded, whereas the reproduction signal is extracted at a reflection coefficient higher than the reflection coefficient of the section B1 including only the concave/convex recording marks MK in the section B2 recording the additional marks SMK on the concave/convex recording marks Mk.

Then, the analog reproduction signal 83 is input into the LPF 707. The LPF 707 extracts only a signal zone recording the additional marks SMK to generate sub information zone signal 84. The sub information zone signal 84 decays the reproduction signal zone of the concave/convex recording marks MK from the analog reproduction signal 83, such that only the signal band components of the additional marks SMK on the concave/convex recording marks MK are extracted. Accordingly, the sub information zone 84 of the section B1 including no additional marks SMK becomes "0" bit as the sub information, and the sub information zone signal 84 of the section B2 including the additional marks SMK becomes "1" bit as the sub information. The sub information is continuously extracted from the clusters, and the prepaid money amount information 85 for 100 Japanese yen can be obtained for one cluster.

The present embodiment exemplifies that the prepaid money amount information 85 for 300 Japanese yen corresponding to three clusters is reproduced as the prepaid money amount information 85 before a billing procedure.

The timing chart 9 at a time when the prepaid money amount information is reproduced from the optical disk after the billing procedure for 100 Japanese yen will now be described.

Firstly, the optical disk recording/reproducing device 700 reads the managing information of the inner circumference control data region of the optical disk 7 at a time of actuating the optical disk 7 and reads the prepaid money amount information from the additional marks formed by changing the reflection coefficient of the reflection film on the concave/convex recording marks of the managing information as well. The managing information 91 recorded by the concave/convex recording marks is arranged such that the clusters encoded into the error-correction code are arranged circumferentially.

The sub information error correction unit 709, after reading the billing information, temporarily stores the prepaid money amount information recorded in the optical disk 7 in the prepaid information memory 710. The system controller 713, after reading the prepaid money amount information, calculates the number of clusters of which additional marks are to be deleted on the basis of the billing information received by the billing information receiving unit 711.

The formatter 704 generates a timing signal 92 representing a section in which the additional marks are to be deleted from the first clusters including the additional marks to output it to the laser power control unit 718. The laser power control unit 718 deletes the additional marks in the section represented by the timing signal 92 by irradiating the high intensity reproduction laser light. In the present embodiment, the timing signal 92 is a signal representing a section corresponding to one cluster since the present embodiment exemplifies the operation when the billing information for 100 Japanese yen is received.

In the first cluster 91*a* to which the high intensity reproducing laser light is irradiated by the timing signal 92, the reflection coefficient of the reflection film changes throughout the region to thereby delete the additional marks. Therefore, the billing procedure can detect the additional marks by detecting the change of the reflection coefficient of the reproduction signal before the billing procedure, whereas the additional marks cannot be detected after the billing procedure since the change of the reflection coefficient of the reproduction signal cannot be detected in the section in which the additional marks has already deleted (an analog reproduction signal 93). Therefore, the prepaid money amount information for 100 Japanese yen is deleted to perform the billing procedure. To the contrary, since high intensity laser light irradiation is not carried out for the second cluster 91*b*, the additional marks are not deleted but the additional marks are reproduced based on the change of the reflection coefficient to thereby reproduce the prepaid money amount for 100 Japanese yen.

Also, as illustrated in the analog reproduction signal 93, in the section having received the irradiation of the high intensity reproduction laser light, a section J1 which does not record the additional marks and reproduces the concave/convex recording marks by the standard reflection coefficient is provided with a change of the reflection coefficient due to the irradiation of the high intensity reproduction laser light. Therefore, no change of the reflection coefficient can be detected between the section J1 and a section J2 which preliminarily records the additional marks, resulting in a substantial deletion of the additional marks.

The difference of average values of the reflection coefficient between a region where the additional marks are formed and a region where no additional marks are formed after being irradiated with laser light at or above a certain intensity becomes smaller than the difference of average values of the reflection coefficient between a region where the additional marks are formed and a region where no additional marks are formed before being irradiated with the laser light at or above a certain intensity.

Therefore, the region where additional marks are deleted comes to have a uniform reflection coefficient in its entirety, such that an analog reproduction signal 94 showing no change of the reflection coefficient due to the additional marks is extracted.

As described above, the additional marks are deleted in the first cluster 91a recording the prepaid money amount information, and thus the prepaid money amount information 95 for 100 Japanese yen is deleted in order to carry out the billing procedure.

As stated above, the optical disk according to the present embodiment is provided with the prepaid money amount information by the additional marks formed by changing the reflection coefficient of the reflection film on the concave/convex recording marks. Therefore, the write once media which records the content information with the reflection coefficient of the recording marks being changed cannot copy the prepaid money amount information. As such, the prepaid money amount information can be recorded, with an illegal copy by an average user being impossible.

Also, the prepaid money amount information is recorded by changing the reflection coefficient of the reflection film, such that an illegal copy by peeling the protection film of the optical disk to transfer the concave/convex recording marks to another optical disk or the like is also impossible.

As described above, the optical disk according to the present embodiment can record the prepaid money amount information while the average user or a pirate edition maker cannot copy the prepaid money amount information, and therefore, the information such as billing information that requires high security can be recorded by the optical disk of the present embodiment.

Also, the optical disk according to the present embodiment employs a reflection film on the concave/convex recording marks capable of irreversible printing such as a pigmented coat that is used generally in write once media to thereby form the additional marks owing to the irreversible printing effect. Similarly, upon deleting the information, the additional marks are recorded by causing irreversible printing to the region where no additional marks are recorded to thereby delete the information. Therefore, even if somebody illegally tries to restore the prepaid money amount information, the prepaid money amount information once deleted cannot be restored. As such, a safe billing procedure can be achieved.

The billing procedure according to the present embodiment is performed without resort to a server connected through a network such as a credit card, electric money, or WEB money. Therefore, the billing procedure of the present embodiment has sufficient power to countervail damage caused by spoofing on a WEB site where the billing procedure is carried out.

Also, about five times as strong as the normal reproduction power will be sufficient for a reproducing power to delete the additional marks, such that the system will be obtainable on the basis of the configuration of commercially available optical disk reproducing devices without increasing the cost. That is, conventional optical disk reproducing devices employ a radio-frequency module for periodically enhancing the reproduction laser intensity in order for stable reproduction signal. Therefore, lasers used in the conventional optical disk reproducing devices already have a potential to output high intensity, resulting in being capable of enhancing the reproduction laser intensity without an additional configuration.

The present embodiment described, but not limited thereto, the usage right information to be recorded by the additional marks in the form of recording the reproduction number information, the reproduction time information, and the prepaid money amount information. The recording number information, the recording time information, the reproduction/recording right period information, the content information copying number information, or the movable number information may be recorded as the usage right information. As such, high level copyright management, which is impossible by the currently marketed optical disks, becomes possible and thus user-friendliness can be improved while protecting the copyright of an author.

The internal configurations of the sub information detection units 307, 508, 708 in optical disk reproducing devices 300, 500, and the optical disk recording/reproducing device 700 will now be described in detail.

Figure 10:
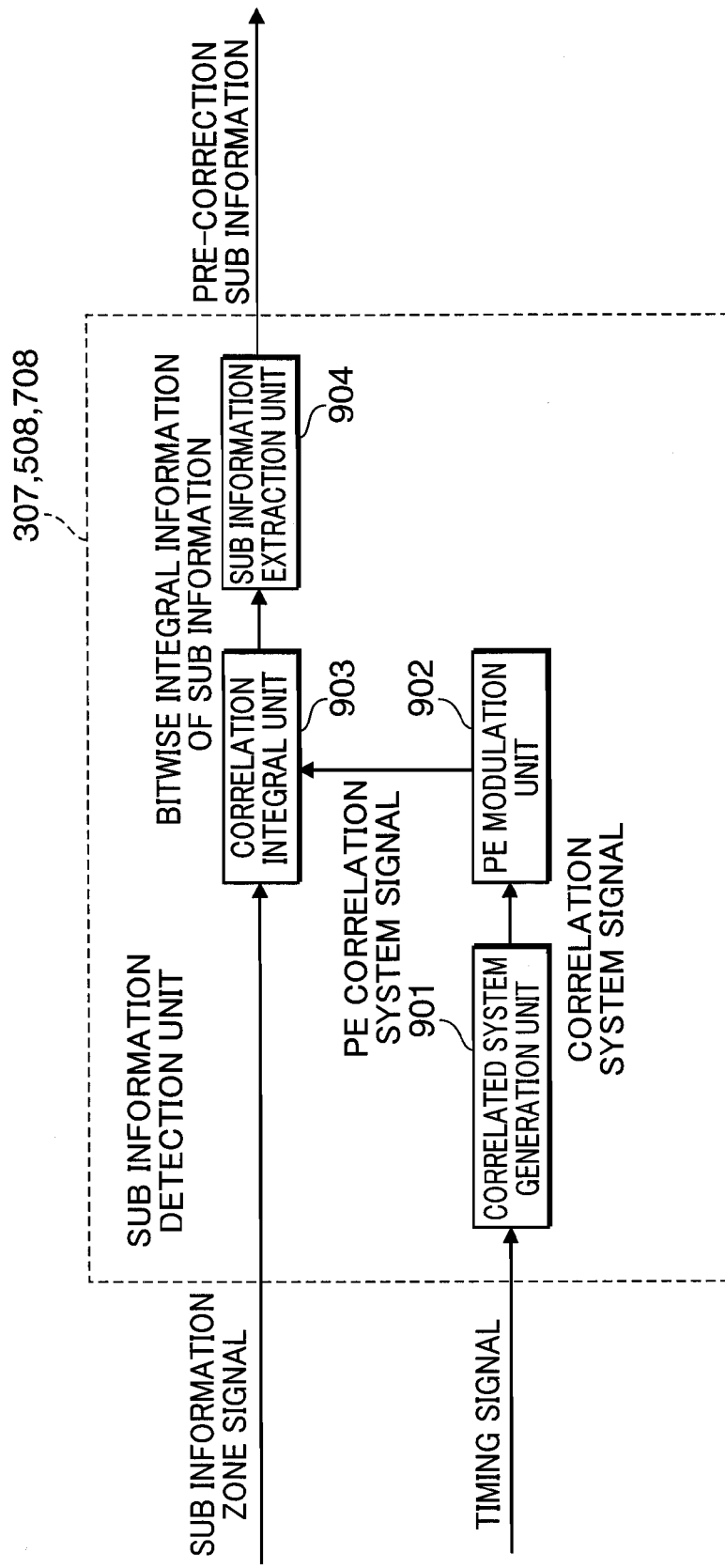
FIG. 10 is a block diagram illustrating an inner configuration of the sub information detection unit of the optical disk reproducing device and the optical disk record reproducing device as shown in FIGS. 4, 6, and 8.

FIG. 10 is a block diagram illustrating inner configurations of the sub information detection units 307, 508, 708 of the optical disk reproducing devices 300, 500 and the optical disk recording/reproducing device 700 of FIGS. 4, 6, and 8. The sub information detection units 307, 508, 708 include a correlated system generation unit 901, a PE modulation unit 902, a correlation integral unit 903, and a sub information extraction unit 904.

The correlated system generation unit 901 generates a correlation system signal on the basis of a timing when the timing signal representing the position information for detecting the sub information is output from each of the formatters 304, 504, 704 to output it to the PE modulation unit 902. The correlation system signal is a pseudo-random number sequence such as a general M-sequence, and the correlated system generation unit 901 comprises a shift register which performs a partial feedback. The optical disk of the present embodiment records the sub information scrambled by a pseudo-random number sequence equal to that generated by the correlated system generation unit 901. Also, according to the present embodiment, the sub information is recorded for every one bit based on 64-channel bits of the concave/convex recording marks. In other words, the correlated system generation unit 901 generates a correlation system signal of 1 bit for every 64-channel bits in time series.

The PE modulation unit 902 provides a PE (phase encoded) modulation to the correlation system signal generated by the correlated system generation unit 901. The optical disk according to the present embodiment records the sub information of 1 bit for every 64-channel bits of the concave/convex recording marks. Therefore, the PE modulation unit 902 provides the PE modulation to the correlation system signal of every 1 bit per a 64-channel bit unit by means of the correlated system generation unit 901. When the correlation system signal "1" is output from the correlated system generation unit 901 with a 64-channel bit width, the PE modulation unit 902 outputs a PE correlation system signal of "1" bit in the former 32-channel bits and of "0" bit in the latter 32-channel bits. On the other hand, when the correlation system signal "0" is output from the correlated system generation unit 901 with the 64-channel bit width, the PE modulation unit 902 outputs a PE correlation system signal composing a "0" bit of the former 32-channel bits and a "1" bit of the latter 32-channel bits. Accordingly, the PE modulation unit 902 generates the PE correlation system signal by providing the PE modulation to the correlation system signal output from the correlated system generation unit 901 to output it to the correlation integral unit 903.

The correlation integral unit 903 calculates a correlative value between the PE correlation system signal input from the PE modulation unit 902 and the sub information zone signal input from each of the LPFs 306, 507, 707 to generate integral information for every one bit of the sub information, thereby outputting it to the sub information extracting unit 904. The sub information zone signal extracts the zone information recording the sub information from the analog reproduction signal which is reflection light when the optical disk is irradiated with laser light by means of each of the LPFs 306, 507, 707.

The LPFs 306, 507, 707 comprise general low pass filters. The sub information of the present embodiment is recorded in the optical disk in a cycle of a 64-channel bit of the concave/convex recording marks. Therefore, it is preferable that the cutoff frequency of the low pass filter is set to below a 128-channel bit cycle. This corresponds to about 2 MHz in a Blue-ray disk at single-multiple speed and about 800 KHz in a DVD-ROM at single-multiple speed. As stated above, the zone signal of the sub information recorded by changing the reflection coefficient of the reflection film on the concave/convex recording marks by each of the LPFs 306, 507, 707 is extracted as the analog sub information zone signal.

Each of the LPFs 306, 507, 707 generates the sub information zone signal by extracting the zone signal recording the sub information from the input analog reproduction signal, followed by binarizing thereof. Therefore, the sub information zone signal comes to be at level H in a region where the reflection coefficient of the reflection film of the optical disk is raised and to have a level L in a region where the reflection coefficient of the reflection film of the optical disk is not changed. The correlation integral unit 903 carries out a correlation integral between the sub information zone signal and the PE correlation system signal per a channel bit unit on the basis of a distance among the 64-channel bits recording the sub information.

In other words, the correlation integral unit 903 adds "+1" to an integrator for every one bit of the sub information when the sub information zone signal is at level H and the PE correlation system signal is at level H, or when the sub information zone signal is at level L and the PE correlation system signal is at level L. On the other hand, the correlation integral unit 903 adds "−1" to the integrator for every one bit of the sub information when the sub information zone signal is at level H and the PE correlation system signal is at level L, or when the sub information zone signal is at level L and the PE correlation system signal is at level H. Accordingly, the correlation integral unit 903 calculates a correlational value between the sub information zone signal and the PE correlation system signal for every section recording 1 bit of the sub information (64-channel bit in the present embodiment). The correlation integral unit 903 calculates the correlational value between the sub information zone signal and the PE correlation system signal for every section recording the sub information to generate the bitwise integral information of the sub information, thereby outputting it to the sub information extraction unit 904.

The sub information extraction unit 904 extracts the sub information from the bitwise integral information of the sub information input from the correlation integral unit 903. The sub information extraction unit 904 generates "0" bit as the sub information bit when the bitwise integral information of the sub information is an integral value of a "positive" number, while it generates "1" as the sub information bit when the bitwise integral information of the sub information is a "negative" number to output it as the pre-correction sub information.

As described above, the zone components recording the sub information are extracted from the analog reproduction signal representing the intensity of the reflection light from the optical disk, and the correlation with the correlation system similar to that used in recording the sub information is integrated to extract the sub information according to the integrated value. Therefore, the integral value between the sub information zone signal and the PE correlation system signal becomes about "0" throughout the entire bits in the optical disk recording no sub information, such that it is determined that no sub information is recorded in the optical disk.

Figure 11:
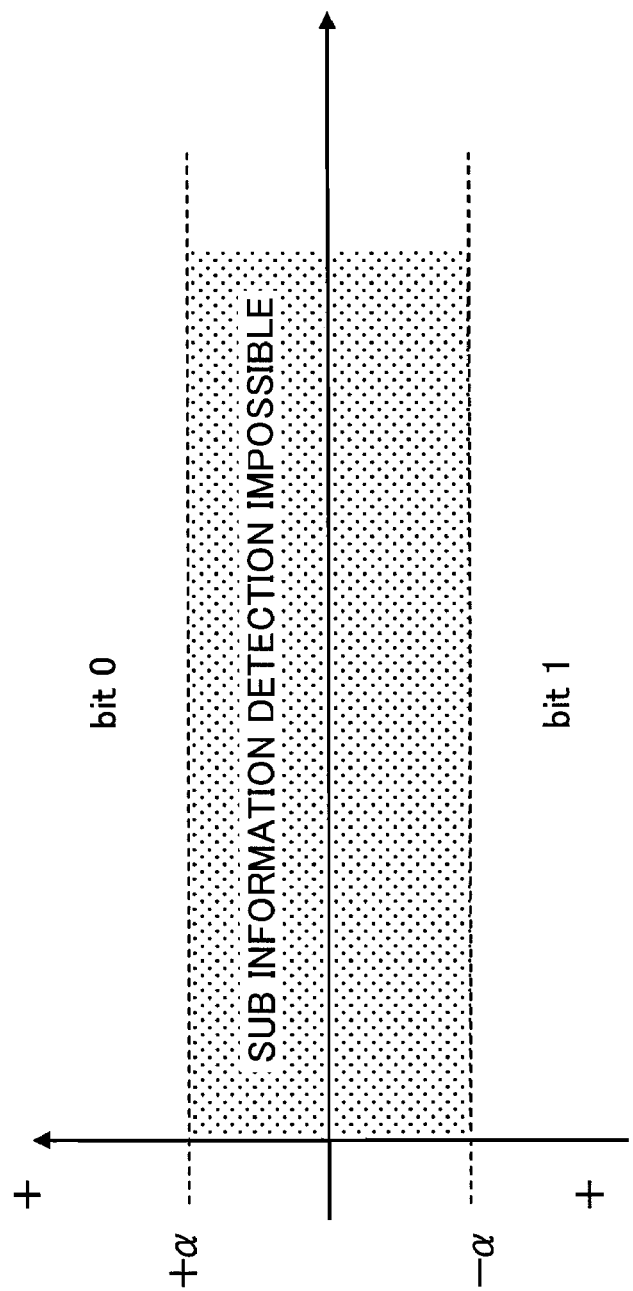
FIG. 11 is a schematic diagram illustrating a method of determining a threshold of integrated values of integrated information for every bit of the sub information in order to extract the sub information of the sub information extraction unit of FIG. 10.

FIG. 11 is a schematic diagram illustrating an integral value threshold determination method of the integral value of the bitwise integral information of the sub information for the sake of extracting the sub information by the sub information extraction unit 904 of FIG. 10.

The sub information extraction unit 904 compares the bitwise integral value of the sub information with a threshold $\pm\alpha$. That is, the sub information extraction unit 904 extracts the bit "0" when the integral value is equal to or more than $+\alpha$ and extracts the bit "1" when the integral value is equal to or less than $-\alpha$ as the sub information bit. However, the sub information extraction unit 904 determines as the sub information read-out error if the integral value is within $\pm\alpha$ because stable reproduction of the sub information is not available. When even the sub information extraction unit 904 determines as the read-out error for even 1 bit of the sub information, the read-out operation of the sub information is repeated or the read-out region of the sub information is changed to another one to carry out the read-out operation of the sub information again. As stated above, since the integral value threshold is determined as to the read-out of the sub information, the optical disk which does not record the sub information and thus the integral value varies around zero will be able to determine a fact that the sub information is not recorded, resulting in that the reproduction of the optical disk can be finalized.

Figure 12:
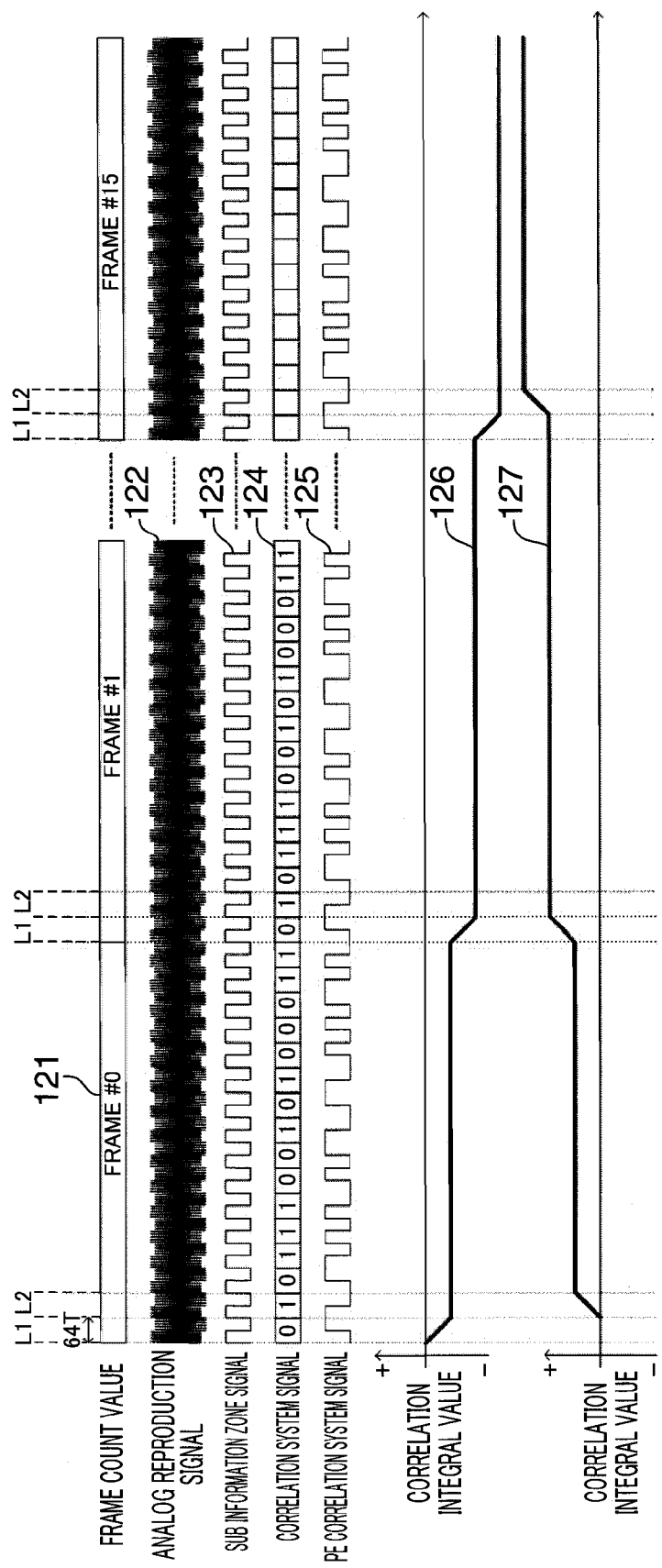
FIG. 12 are timing charts illustrating sub information read operations by the sub information detection unit of the optical disk reproducing device and the optical disk record reproducing device according to the present embodiment.

FIG. 12 is a timing chart illustrating an operation of reading the sub information by the sub information detection unit 307, 508, 708 of the optical disk reproducing devices and the optical disk recording/reproducing device.

The optical disk of the present embodiment records the managing information and the content information by means of the concave/convex recording marks and is provided with the sub information recorded thereon by changing the reflection coefficient by irradiating the laser light onto the reflection film on the concave/convex recording marks. The concave/convex recording marks are continuously recorded on the optical disk in its circumference direction by a frame unit sectioned by the synchronization code. The frame of the present embodiment will be described exemplifying the case where it has a 1024-channel bit length (a frame count value 121 of FIG. 12).

An analog reproduction signal 122 of FIG. 12 is output from each of the analog signal processing units 302, 502, 702. The sub information recorded in the optical disk contains 16-bit sub information in one frame synchronizing with a frame unit. Therefore, the sub information of 1 bit is recorded in a 64-channel bit length (section L1). The sub information of 1 bit is recorded with the PE modulation. Therefore, in the 64-channel bit section, the first 32-channel bits have a high reflection coefficient due to irradiation of laser light, whereas the other 32-channel bits are not subjected to irradiation of the laser light.

A sub information zone signal 123 of FIG. 12 is input to each of the sub information detection units 307, 508, 708 from each of the LPFs 306, 507, 707. The sub information zone signal 123 is a signal having been binarized after the recording zone information of the sub information is extracted from the analog reproduction signal 122 from each of the LPFs 306, 507, 707. Consequently, the sub information zone signal 123 comes to have level H at the region where the laser light is irradiated onto the concave/convex recording marks of the optical disk to have higher reflection coefficient, followed by being input into a correlation integral unit 903.

A correlation system signal 124 of FIG. 12 is generated in the correlated system generation unit 901. The correlated system generation unit 901 receives a timing signal representing a top position of the frames from each of the formatters 304, 504, 704 and generates the correlation system signal 124 of 1 bit for every 64-channel bit based on the timing signal to output it to the PE modulation unit 902.

A PE correlation system signal 125 of FIG. 12 is generated by the PE modulation unit 902 by providing the PE modulation to the correlation system signal 124. When the correlation system signal 124 is "0" bit, the PE modulation unit 902 generates the PE correlation system signal 125 having "0" bit for the former 32-channel bits and "1" bit for the latter 32-channel bits to output it to the correlation integral unit 903. Also, when the correlation system signal 124 is "1" bit, the PE modulation unit 902 generates the PE correlation system signal 125 having "1" bit for the former 32-channel bits and "0" bit for the latter 32-channel bits to output it to the correlation integral unit 903.

Correlation integral values 126, 127 between the sub information zone signal and the PE correlation system signal are calculated by the correlation integral unit 903. The correlation integral value 126 of FIG. 12 shows a transition of the correlation integral value of the sub information recorded in the section L1, and the correlation integral value 127 of FIG. 12 shows a transition of the correlation integral value of the sub information recorded in the section L2. The relation between the sub information zone signal 123 and the correlation system signal 124 is negative in the section L1, and thus the correlation integral value 126 is integrated to a negative direction. To the contrary, the relation between the sub information zone signal 123 and the correlation system signal 124 is positive in the section L2, and thus the correlation integral value 127 is integrated to a positive direction.

Also, in the present embodiment, the same sub information bit is recorded in every frame. In the optical disk reproducing devices and the optical disk recording/reproducing device according to the embodiment, when the integrated value of each bit of the sub information excesses either one of the positive threshold or the negative threshold ($\pm\alpha$) of FIG. 11, the sub information extraction unit 904 extracts the sub information. On the other hand, when either bit of the sub information is below the threshold even after the integral has completed for the entire sections recording the sub information, the sub information extraction unit 904 outputs a read-out error.

The sub information can be read from the optical disk recording the sub information by changing the reflection coefficient of the reflection film on a track of the concave/convex recording marks, and an absence of the sub information can be determined when no sub information is recorded thereon.

A sub information deletion confirmation processing for confirming whether or not the sub information has been deleted in the optical disk reproducing devices and the optical disk recording/reproducing device of the present embodiment will now be described.

FIG. 13 is a flow chart illustrating a flow of a process of reproducing the sub information, deleting the sub information, and confirming deletion of the sub information. Operations of the sub information deletion confirmation processing will be described using the optical disk reproducing device 300 of FIG. 4 and the sub information detection unit 307 of FIG. 10.

Initially, the system controller 314 reproduces the sub information from the recording region of the sub information in order to confirm whether or not there is usage right information to the user's operation in accordance with the user's operation in step S1. Examples of the above usage right information include information representing an authority in reproducing the content information such as the reproduction number of the content information and the reproducible time of the content information, information representing an authority in copying the content information such as the copiable number of the content information and the copiable period of the content information, or the money amount information for billing the user when he/she downloads the content information through a network.

Then, the sub information extraction unit 904 of the sub information detection unit 307 determines whether or not the correlation integral values of the every bit of the sub information excesses the threshold $\pm\alpha$ of FIG. 11 to thereby determine whether or not the sub information is recorded therein in step S2.

If it is so determined that even one bit of the correlation integral values of every bit of the sub information is below the threshold $\pm\alpha$ (if NO in step S2), the sub information extraction unit 904 output a sub information read-out error to the system controller 314 to end the processing in step S3.

If it is so determined that all of the correlation integral values of every bit of the sub information exceed the threshold $\pm\alpha$ (if YES in step S2), the sub information extraction unit 904 outputs the pre-correction sub information to the sub information error correction unit 308 since the sub information was detected. Then, the sub information error correction unit 308 carries out an error correction processing of the sub information to extract the usage right information (reproducible number information) from the sub information in step S4. Accordingly, the usage right information is reproduced as the sub information.

Subsequently, the reproducible number determination unit 309 determines whether or not the user-specified operation, namely the reproduction of the content information, is available based on the usage right information (reproducible number information) in step S5. Here, if it is so determined that the user-specified operation is not available (if NO in step S5), the reproducible number determination unit 309 outputs the user operation error to the system controller 314 in step S6. The system controller 314 displays that the user-specified operation was not available on a not-shown display device when the user operation error is input.

On the other hand, if it is so determined that the user-specified operation is available (if YES in step S5), the reproducible number determination unit 309 executes a right according to the user's operation. That is, the reproducible number determination unit 309 outputs the reproduction allowance signal to the switch 310. Accordingly, the content information is reproduced in step S7. After the content information is reproduced, the system controller 314 deletes the sub information (usage right information) in accordance with the content of the execution of the right in step S8. More specifically, if the reproducible number information is recorded as the sub information, the system controller 314 outputs an update command to the formatter 304 in order to delete reproduction allowance information for every one reproduction of the content information. Also, if the usage right information is the prepaid money amount information, the system controller 314 outputs an update command to the formatter 304 in order to delete the prepaid money amount information recorded in the optical disk as the sub information in accordance with the billing information.

After the sub information is deleted, the system controller 314 moves the optical head 301 to a region where the sub information has been deleted to confirm whether or not the sub information has been deleted correctly in step S9. Here, a processing similar to the reproduction of the sub information carried out in step S1 is performed.

Then, the sub information extraction unit 904 of the sub information detection unit 307 confirms that the correlation integrated values of every bit of thus reproduced sub information is within a range of the threshold $\pm\beta$ when the sub information was deleted. In other words, the sub information extraction unit 904 determines whether or not the correlation integral values of every bit of thus reproduced sub information exceeds the threshold $\pm\beta$ at the time the sub information was deleted and thereby determines whether or not the sub information has been deleted in step S10. The threshold $\pm\beta$ of the correlation integral values at the time when the sub information was deleted is set to be small values with regard to the threshold $\pm\alpha$ of the correlation integral values at the time when the sub information is reproduced ($\alpha > \beta$). Accordingly, if an absolute value of the correlation integral values of all the bits of the sub information at the time when the sub information is deleted is equal to or less than the threshold $\beta$, the region where the sub information has already been deleted will not be reproduced in error at the time of the reproduction when the determination is carried out at the threshold $\alpha$ which is larger than the threshold $\beta$. Therefore, it is required to set the threshold $\pm\beta$ upon deleting the sub information to a small value with regard to the threshold $\pm\alpha$ of the correlation integral value upon reproducing the sub information.

Here, if it is so determined that even 1 bit among the correlation integral values of every bit of the sub information excesses the threshold $\pm\beta$ (if YES in step S10), the step returns to step S8 to carry out the deletion operation of the sub information again. On the other hand, if it is so determined that all the correlation integrate values of every bit of the sub information is below the threshold $\pm\beta$ (if NO in step S10), the system controller 314 ends the processing since the sub information has deleted in safe.

As described above, since the laser light is irradiated onto the region where the sub information having deleted was recorded after the sub information was deleted, and the sub information detection unit 307 confirms whether or not the sub information is detected, the sub information can be deleted completely.

As described above, in the optical disk reproducing devices and the optical disk recording/reproducing device according to the present embodiment, the content information is reproduced or recorded in accordance with the user's operation after the usage right information (sub information) is reproduced, and thereafter the usage right information (sub information) is deleted in accordance with the user's operation. After the usage right information (sub information) is deleted, a confirmation whether or not the sub information has been deleted safely can be carried out by confirming the deletion of the usage right information using a threshold condition more strict than the threshold condition used in the reproduction of the usage right information. Therefore, when the user executes the right to reproduce the content information, such a situation is avoidable that the usage right information was not deleted and thereby the usage right of the content information is provided to the user again.

The above-described embodiment mainly includes inventions having the following configurations.

An aspect of the optical disk of the invention includes: a substrate on which concave/convex recording mark for recording main information is preliminarily formed; and a reflection film which covers the substrate and of which the reflection coefficient is changed by irradiating laser light at or above a certain intensity; in which the reflection film includes additional marks for recording sub information by changing the reflection coefficient of the reflection film on a region where the concave/convex recording marks are formed, the sub information is recorded for every predetermined recording unit to which the main information is recorded, and the main information is reproduced as well as the sub information is deleted by irradiating the laser light above the certain intensity onto the region recording the sub information.

With the above configuration, the optical disk includes the substrate on which the concave/convex recording marks for recording the main information, and the reflection film which covers the substrate and of which the reflection coefficient is changed by irradiating the laser light above the certain intensity. The reflection film includes the additional marks preliminarily formed thereon for recording the sub information by changing the reflection coefficient of the reflection film on the region where the concave/convex recording marks are formed. The sub information is recorded every predetermined recording unit in which the main information is recorded and the laser light at or above the certain intensity is irradiated onto the region where the sub information is recorded, thereby reproducing the main information and deleting the sub information as well.

Therefore, since the sub information is recorded by changing the reflection coefficient of the reflection film and the sub information is deleted by irradiating the laser light at or above the certain intensity, illegal copying and alternation of the sub information is avoidable.

In the above-described optical disk, it is preferable that the reflection coefficient of the reflection film changes by being irradiated with the laser light having an intensity higher than the reproduction laser intensity for reproducing the concave/convex recording marks, and that the sub information is deleted by minimizing the average difference of the reflection coefficient between the region where the additional marks are formed and the region where no additional marks are formed before and after the laser light at or above the certain intensity is irradiated.

With the above configuration, the reflection coefficient of the reflection film changes by irradiating the laser light having an intensity higher than that of the reproduction laser intensity for reproducing the concave/convex recording marks. A difference of an average of the reflection coefficient in the region where the additional marks are formed and the region where no additional marks are formed after the laser light at or above the certain intensity is irradiated is minimized than a difference of an average of the reflection coefficient in the region where the additional marks are formed and the region where no additional marks are formed before the laser light at or above the certain intensity is irradiated, thereby deleting the sub information.

Therefore, as a result of the irradiation of the laser light above the certain intensity, the additional marks are formed on a region where no additional marks are formed in the region where the sub information is recorded, and thus the difference of the average reflection coefficient between the region where the additional marks are formed and the region where no additional marks are formed, such that the sub information can be deleted.

In the above-described optical disk, it is preferable that the reflection coefficient is changed irreversibly. With such a configuration, since the sub information is deleted due to the irreversible change of the reflection coefficient of the reflection film, the reflection coefficient cannot be restored to the original one once the reflection coefficient is changed. As such, the sub information can be prevented from being altered.

Also, in the above-described optical disk, it is preferable that the predetermined recording unit is formed by a frame unit sectioned by the synchronization code. With such a configuration, the sub information can be recorded per frame unit sectioned by the synchronization code.

Also, in the above-described optical disk, it is preferable that the predetermined recording unit is formed by a sector unit sectioned by the address information. With such a configuration the sub information can be recorded per sector unit sectioned by the address information.

Also, in the above-described optical disk, it is preferable that the predetermined recording unit is formed by an error-correction encoded cluster unit. With such a configuration, the sub information can be recorded per error-correction encoded cluster unit.

Also, in the above-described optical disk, it is preferable that the main information contains the content information and the managing information for managing the content information, in which the sub information further contains the usage right information as to a right to use the content information.

With such a configuration, the usage right information as to a right to use the content information is recorded by changing the reflection coefficient of the reflection film on the region where the concave/convex recording marks are formed, and the laser light above the certain intensity is irradiated onto the region where the usage right information is recorded, resulting in that the content information or the managing information are reproduced as well as the usage right information is deleted. Therefore, the usage right information can be deleted in accordance with the use of the content information and a safe use of the content information can be managed only with the optical disk.

Also, in the above-described optical disk, it is preferable that the usage right information contains the reproducible number information representing the number of times allowed to reproduce the content information.

With such a configuration, the reproducible number information representing the number of times allowed to reproducing the content information is recorded by changing the reflection coefficient of the reflection film on the region where the concave/convex recording marks are formed and the laser light at or above the certain intensity is irradiated onto the region recording the reproducible number information, such that the content information or the managing information is reproduced as well as the reproducible number information is deleted.

Therefore, the reproducible number information can be deleted in accordance with the reproduction of the content information, and thus safe management of the reproduction number of the content information only with the optical disk. Also, the copyright management for limiting the reproducible number of the content information recorded in the optical disk can be realized.

Also, in the above-described optical disk, it is preferable that the usage right information contains the reproducible time information representing the time to allow the reproduction of the content information.

With such a configuration, the reproducible time information representing the time to allow the reproduction of the content information is recorded by changing the reflection coefficient of the reflection film on the region where the concave/convex recording marks are formed, and the laser light is irradiated onto the region where the reproducible time information is recorded, such that the content information or the managing information is reproduced as well as the reproducible time information is deleted.

Therefore, the reproducible time information can be deleted in accordance with the reproduction of the content information, and thus safe management of the reproducible time of the content information recorded in the optical disk can be realized. Also, copyright management to limit the reproducible time of the content information recorded in the optical disk can be realized.

Also, in the above-described optical disk, it is preferable that the usage right information contains the money amount information representing the money amount available for a billing procedure to be carried out when the user obtains the content information.

With such a configuration, the money amount information representing the money amount available for the billing procedure when the user obtains the content information is recorded by changing the reflection coefficient of the reflection film on the region where the concave/convex recording marks are formed, and the laser light above the certain intensity is irradiated onto the region recording the money amount information such that the content information or the managing information is reproduced as well as the money amount information is deleted. Therefore, the money amount information can be deleted in accordance with the user's obtaining of the content information and thus safe billing with regard to the content information can be managed only with the optical disk.

An optical disk reproducing device according to another aspect of the invention includes: a laser light irradiation unit for irradiating laser light onto an optical disk provided with concave/convex recording marks for recording main information as well as provided with additional marks for recording sub information by changing a reflection coefficient of a reflection film on a region where the concave/convex recording marks are formed; a reproduction signal generation unit for generating reproduction signal based on reflected light from the optical disk; a clock signal extraction unit for extracting clock signal synchronizing with the reproduction signal generated by the reproduction signal generation unit; a main information reproduction unit for reproducing the main information from the signal band components corresponding to the concave/convex recording marks of the reproduction signal generated by the reproduction signal generation unit synchronizing with the clock signal extracted by the clock signal extraction unit; a filter unit for extracting the signal band components corresponding to the additional marks from the reproduction signal generated by the reproduction signal generation unit; a sub information detection unit for detecting the sub information from the signal band components extracted by the filter unit synchronizing with the clock signal extracted by the clock signal extraction unit; a usage right information generation unit for generating usage right information as to a right to use content information from the sub information detected by the sub information detection unit; a user operation reception unit for receiving an operation of the user to the content information; a user operation determination unit for determining whether or not the operation received by the user operation reception unit is available on the basis of the usage right information generated by the usage right information generation unit; and a sub information deletion unit for reproducing the main information by irradiating laser light at or above a certain intensity onto the optical disk as well as deleting the sub information, when the user operation determination unit determines that the operation is available.

With such a configuration, the laser light is irradiated onto the optical disk where the concave/convex recording marks are formed in order to record the main information and the additional marks are also formed for recording the sub information by changing the reflection coefficient of the reflection film on the region where the concave/convex recording marks are formed. Then, the reproduction signal is generated based on the reflection light from the optical disk to extract the clock signal synchronizing with the thus generated reproduction signal. The main information is reproduced from the signal band components corresponding to the concave/convex recording marks of the thus generated reproduction signal synchronizing with thus extracted clock signal. The signal band components corresponding to the additional marks are extracted from thus generated reproduction signal, and the sub information is detected from the thus extracted signal band components synchronizing with the thus extracted clock signal. The usage right information as to the right to use the content information is generated from the thus detected sub information to receive the operation by the user with regard to the content information. Then, whether or not the thus received operation is available is determined based on the thus generated usage right information, and if it is determined that the operation is available, the laser light at or above the certain intensity is irradiated onto the optical disk to reproduce the main information as well as to delete the sub information.

As described above, the sub information is recorded by changing the reflection coefficient of the reflection film, and also the sub information is deleted by irradiating the laser light at or above the certain intensity, such that the sub information is prevented from being copied or altered illegally.

Additionally, the laser light irradiation unit and the sub information deletion unit may be configured into one piece.

Also, in the above-described optical disk reproducing device, it is preferable that the filter unit decays the signal band components corresponding to the concave/convex recording marks of the reproduction signal and extracts signal band components in a frequency zone lower than the above-described signal band components.

With such a configuration, the signal band components corresponding to the concave/convex recording marks of the reproduction signal is decayed and the signal band components in the frequency zone lower than the signal band components corresponding to the concave/convex recording marks are extracted, such that the signal band components corresponding to the additional marks can be extracted.

Also, in the above-described optical disk reproducing device, it is preferable that the usage right information contains the reproducible number information representing the number of allowable reproduction of the content information; the reproducible number information is recorded for each predetermined recording unit of the main information and contains the reproduction allowance information representing the unit reproducible number of the content information; the sub information detection unit detects the reproduction allowance information recorded for every predetermined recording unit of the main information as the sub information; and the sub information deletion unit deletes the reproduction allowance information of a region of the predetermined recording unit after the content information of the unit reproducible number has reproduced.

With such a configuration, the usage right information contains the reproducible number information representing the allowable number to reproduce the content information, and the reproducible number information contains the reproduction allowance information which is recorded for every predetermined recording unit of the main information and is representing the unit reproducible number of the content information. Then, the reproduction allowance information recorded for every predetermined recording unit of the main information is detected as the sub information and, after the content information of the unit reproducible number has reproduced, the reproduction allowance information of a region of the predetermined recording unit is deleted.

Therefore, the reproduction allowance information representing the unit reproducible number of the content information which is recorded for every predetermined recording unit of the main information is deleted in response to the reproduction of the content information, such that a safe management of the reproduction number of the content information can be realized. Also, management of the copyright to limit the reproducible number of the content information recorded in the optical disk can also be realized.

Also, in the above-described optical disk reproducing device, it is preferable that the usage right information contains the reproducible time information representing the allowable time for reproducing the content information; the reproducible time information contains the reproduction allowance information which is recorded for every recording unit of the main information and represents the unit reproducible time of the content information; the sub information detection unit detects the reproduction allowance information recorded for every predetermined recording unit of the main information as the sub information; and the sub information deletion unit deletes the reproduction allowance information of a region of the predetermined recording unit after the content information of the unit reproducible time has reproduced.

With such a configuration, the usage right information contains the reproducible time information representing the allowable time to reproduce the content information; and the reproducible time information contains the reproduction allowance information which is recorded for every predetermined recording unit of the main information and represents the unit reproducible time of the content information. Then, the reproduction allowance information recorded in every predetermined recording unit of the main information is detected as the sub information and the reproduction allowance information of a region of the predetermined recording unit is deleted after the content information of the unit reproducible time has reproduced.

Therefore, since the reproduction allowance information which is recorded for every predetermined recording unit of the main information and represents the unit reproducible time of the content information is deleted, safe management of the reproduction time of the content information can be realized. Also, copyright management to limit the reproducible time of the content recorded in the optical disk can be realized.

Also, in the above-described optical disk reproducing device, it is preferable that the usage right information contains the money amount information representing the money amount available for the billing procedure when the user obtains the content information; the money amount information contains unit money amount information which is recorded for every predetermined unit of the main information and represents a money amount of a predetermined unit; the sub information detection unit detects the unit money amount information recorded for every predetermined recording unit of the main information as the sub information; the optical disk reproducing device further includes an obtaining unit for obtaining the billing information representing the money amount to be billed with regard to the content information and a deletion determination unit for subtracting the money amount represented by the billing information obtained by the obtaining unit from the money amount represented by the unit money amount information detected by the sub information detection unit to determine a section where the sub information is to be deleted on the basis of the subtracting result; and the sub information deletion unit deletes the sub information of the section determined by the deletion determination unit.

With such a configuration, the usage right information contains the money amount information representing the money amount capable of being used in the billing procedure taken when the user obtains the content information, and the money amount information is recorded for every predetermined recording unit of the main information and contains the unit money amount information representing the money mount of the predetermined unit. The unit money amount information recorded for every predetermined recording unit of the main information is detected as the sub information and the billing information representing the money amount to be billed corresponding to the content information is obtained. The money amount represented by the thus obtained billing information is subtracted from the money amount represented by the thus detected unit money amount information and the section of which sub information is to be deleted based on the subtraction result is determined to thereby delete the sub information of thus determined section.

Therefore, since the money amount to be billed corresponding to the content information is subtracted from the billing-available money amount recorded in the optical disk and the sub information according to the subtraction result is deleted, safe billing management of the content information can be realized only with the optical disk.

Also, in the above-described optical disk reproducing device, it is preferable that the sub information deletion unit irradiates laser light at an intensity higher than the reproduction laser light intensity for reproducing the concave/convex recording marks when the user operation determination unit determines that the operation is available to reproduce the main information as well as delete the sub information.

With such a configuration, when the user operation determination unit determines that the operation is available, the laser is irradiated at the intensity higher than the reproduction laser light intensity for reproducing the concave/convex recording marks to reproduce the main information as well as delete the sub information.

Therefore, since the laser light is irradiated at the intensity higher than the reproduction laser light intensity for reproducing the concave/convex recording marks, the additional marks will come to be formed in a region where no additional marks are formed in the region where the sub information is recorded, thereby deleting the sub information.

Also, in the above-described optical disk reproducing device, it is preferable that the sub information deletion unit irradiates the laser light at an intensity equal to or above five times the reproduction laser light intensity for reproducing the concave/convex recording marks when the user operation determination unit determines that the operation is available to thereby reproduce the main information as well as deleting the sub information.

With such a configuration, the laser light at the intensity equal to or above five times the reproduction laser light intensity for reproducing the concave/convex recording marks is irradiated when the user operation determination unit determines that the operation is available to reproduce the main information as well as delete the sub information.

Therefore, since the laser light at the intensity equal to or above five times the reproduction laser light intensity for reproducing the concave/convex recording marks is irradiated, the additional marks are formed on a region where no additional marks are formed in the region where the sub information is recorded, thereby deleting the sub information.

Also, in the above-described optical disk reproducing device, it is preferable that the optical disk reproducing device further includes a radio-frequency module for superimposing a radio-frequency pulse upon the laser to be irradiated onto the optical disk, in which the sub information deletion unit does not use the radio-frequency module when it irradiates the laser light at or above the certain intensity.

With such a configuration, the laser light is irradiated without using the radio-frequency module which superimposes the radio-frequency wave pulse upon the laser light to be irradiated when the laser light at or above the certain intensity, such that the laser light can be irradiated onto the optical disk at the intensity higher than the reproduction laser light intensity for reproducing the concave/convex recording marks. Also, since the known optical disk reproducing device has a radio-frequency module, no additional physical element is required, but the laser light at or above the certain intensity can be irradiated by controlling whether or not the radio-frequency module is used.

Also, in the above-described optical disk reproducing device, it is preferable that the optical disk reproducing device further includes the radio-frequency module for superimposing the radio-frequency wave pulse upon the laser light to be irradiated onto the optical disk, and the sub information deletion unit lowers the superimposed frequency of the radio-frequency pulse of the radio-frequency module which superimposes upon the laser light for reproducing the concave/convex recording marks when the laser light at or above the certain intensity is irradiated.

With such a configuration, since the frequency of the radio-frequency pulse of the radio-frequency module superimposed upon the laser light to be irradiated in order to reproduce the concave/convex recording marks when the laser light at or above the certain intensity, the laser light can be irradiated at the intensity higher than the reproduction laser intensity for reproducing the concave/convex recording marks. Also, since the known optical disk reproducing device has the radio-frequency module, no additional physical element is required to irradiate the laser light at or above the certain intensity by controlling the frequency of the radio-frequency pulse of the radio-frequency module to be superimposed upon the laser light.

Also, in the above-described optical disk reproducing device, it is preferable that the sub information detection unit, after the sub information is deleted, irradiates the laser light onto the region where the sub information was recorded to confirm whether or not the sub information is detected.

With such a configuration, since the laser light, after the sub information is deleted, is irradiated onto the region where the sub information was recorded to detect whether or not the sub information is detected, the sub information can be deleted completely.

The optical disk and the optical disk reproducing device according to the present invention is advantageous as the optical disk and the optical disk reproducing device which prevents the sub information from being illegally copied or altered; records the main information by means of the concave/convex recording marks; and records the sub information by changing the reflection coefficient of the reflection film on the region where the concave/convex recording marks are formed.

This application is based on patent application Nos. 2007-074178 and 2008-060949 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An optical disk comprising:
   a substrate preliminarily provided with concave/convex recording marks formed thereon for recording main information; and
   a reflection film which covers the substrate and of which a reflection coefficient is changed by irradiating laser light at or above a certain intensity;
   wherein the reflection film is preliminarily provided with additional marks for recording sub information by changing the reflection coefficient of the reflection film on a region where the concave/convex recording marks are formed,
   wherein the sub information is recorded for every predetermined recording unit for recording the main information,
   wherein the laser light at or above the certain intensity is irradiated onto the region where the sub information is recorded to thereby reproduce the main information and delete the sub information,
   wherein the sub information is deleted by minimizing a difference of an average value of the reflection coefficient between a region where the additional marks are formed and a region where the additional marks are not formed before and after the laser light at or above the certain intensity is irradiated, and
   wherein the certain intensity is a light intensity higher than a reproduction laser light intensity for reproducing the concave/convex recording marks.

2. The optical disk according to claim 1, wherein the reflection coefficient of the reflection film is irreversibly changed.

3. The optical disk according to claim 1, wherein the predetermined recording unit is a frame unit to be sectioned by a synchronization code.

4. The optical disk according to claim 1, wherein the predetermined recording unit is a sector unit to be sectioned by address information.

5. The optical disk according to claim 1, wherein the predetermined recording unit is a cluster unit encoded into an error-corrected code.

6. The optical disk according to claim 1,
   wherein the main information contains content information and managing information for managing the content information; and
   wherein the sub information contains usage right information as to a right to use the content information.

7. The optical disk according to claim 6, wherein the usage right information contains reproducible number information representing an allowable number of times for reproducing the content information.

8. The optical disk according to claim 6, wherein the usage right information contains reproducible time information representing an allowable time for reproducing the content information.

9. The optical disk according to claim 6, the usage right information contains money amount information representing a money amount available for a billing procedure taken when a user obtains the content information.

10. An optical disk reproducing device comprising:
    a laser light irradiation unit for irradiating laser light onto an optical disk provided with concave/convex recording marks for recording main information, and provided with additional marks for recording sub information by changing a reflection coefficient of a reflection film on a region where the concave/convex recording marks are formed;
    a reproduction signal generation unit for generating a reproduction signal based on reflection light from the optical disk;
    a clock signal extraction unit for extracting a clock signal synchronizing with the reproduction signal generated by the reproduction signal generation unit;
    a main information reproduction unit for reproducing main information from signal band components corresponding to the concave/convex recording marks of the reproduction signal generated by the reproduction signal generation unit synchronizing with the clock signal extracted by the clock signal extraction unit;
    a filter unit for extracting signal band components corresponding to the additional marks from the reproduction signal generated by the reproduction signal generation unit;
    a sub information detection unit for detecting the sub information from the signal band components extracted by the filter unit synchronizing with the clock signal extracted by the clock signal extraction unit;
    a usage right information generation unit for generating usage right information as to a right to use content information from the sub information detected by the sub information detection unit;
    a user operation reception unit for receiving an operation of a user with regard to the content information;
    a user operation determination unit for determining whether or not the operation received by the user operation reception unit is available based on the usage right information generated by the usage right information generation unit; and
    a sub information deletion unit which irradiates laser light at or above a certain intensity onto the optical disk to reproduce the main information and to delete the sub information when the user operation determination unit determines that the operation is available,
    wherein the sub information deletion unit deletes the sub information by minimizing a difference of an average value of the reflection coefficient between a region where the additional marks are formed and a region where the additional marks are not formed before and after the laser light at or above the certain intensity is irradiated.

11. The optical disk reproducing device according to claim 10, wherein the filter unit decays the signal band components corresponding to the concave/convex recording marks of the reproduction signal and extracts signal band components in a frequency zone lower than the signal band components.

12. The optical disk reproducing device according to claim 10,
wherein the usage right information contains reproducible number information representing an allowable number of times for reproducing the content information;
wherein the reproducible number information contains reproduction allowance information which is recorded to every predetermined recording unit of the main information and represents a unit reproducible number of the times of the content information;
wherein the sub information detection unit detects the reproduction allowance information recorded in every predetermined recording unit of the main information as the sub information; and
wherein the sub information deletion unit deletes the reproduction allowance information of a region of the predetermined recording unit after the content information of the unit reproducible number has reproduced.

13. The optical disk reproducing device according to claim 10,
wherein the usage right information contains reproducible time information representing an allowable time to reproduce the content information;
wherein the reproducible time information contains reproduction allowance information which is recorded for every predetermined recording unit of the main information and represents a unit reproducible time of the content information;
wherein the sub information detection unit detects as the sub information the reproduction allowance information recorded for every predetermined recording unit of the main information; and
wherein the sub information deletion unit deletes the reproduction allowance information of a region of the predetermined recording unit after the content information of the unit reproducible time has reproduced.

14. The optical disk reproducing device according to claim 10,
wherein the usage right information contains money amount information representing a money amount available for a billing procedure when the user obtains the content information;
wherein the money amount information contains unit money amount information which is recorded for every recording unit of the main information and represents a money amount of a predetermined unit;
wherein the sub information detection unit detects as the sub information the unit money amount information recorded for every predetermined recording unit of the main information;

wherein the optical disk reproducing device further includes:
an obtaining unit for obtaining billing information representing the money amount to be billed with regard to the content information; and
a deletion determination unit which subtracts the money amount represented by the billing information obtained by the obtaining unit from the money amount represented by the unit money amount information detected by the sub information detection unit and determines a section of which sub information is to be deleted on the basis of the subtraction result; and
wherein the sub information deletion unit deletes the sub information of the section determined by the deletion determination unit.

15. The optical disk reproducing device according to claim 10, wherein the sub information deletion unit reproduces the main information and deletes the sub information by irradiating the laser light at a laser light intensity higher than a reproduction laser light intensity for reproducing the concave/convex recording marks when the user operation determination unit determines that the operation is available.

16. The optical disk reproducing device according to claim 15, wherein the sub information deletion unit reproduces the main information and deletes the sub information by irradiating the laser light at or above a laser light intensity of five times the reproduction laser light intensity for reproducing the concave/convex recording marks when the user operation determination unit determines that the operation is available.

17. The optical disk reproducing device according to claim 10,
wherein the optical disk reproducing device further includes a radio-frequency module for superimposing a radio-frequency pulse upon the laser light to be irradiated onto the optical disk; and
wherein the sub information deletion unit uses no radio-frequency module upon irradiating the laser light at or above the certain intensity.

18. The optical disk reproducing device according to claim 10,
wherein the optical disk reproducing device further includes a radio-frequency module for superimposing a radio-frequency pulse upon the laser light to be irradiated on to the optical disk; and
wherein the sub information deletion unit lowers a frequency of the radio-frequency pulse of the radio-frequency module to be superimposed upon the laser light to be irradiated for reproducing the concave/convex recording marks upon an irradiation of the laser light at or above the certain intensity.

19. The optical disk reproducing device according to claim 10, wherein the sub information detection unit, after deleting the sub information, irradiates the laser light onto a region where the sub information was recorded to confirm whether or not the sub information is detected.

* * * * *